(12) United States Patent
Siegel et al.

(10) Patent No.: US 8,725,595 B1
(45) Date of Patent: May 13, 2014

(54) METHOD AND SYSTEM FOR APPRAISING A COLLECTION OF PRODUCTS

(75) Inventors: Hilliard B. Siegel, Seattle, WA (US); Varun Narang, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 2304 days.

(21) Appl. No.: 11/097,832

(22) Filed: Mar. 31, 2005

Related U.S. Application Data

(63) Continuation-in-part of application No. 10/920,149, filed on Aug. 17, 2004, now abandoned, which is a continuation-in-part of application No. 10/864,291, filed on Jun. 9, 2004.

(51) Int. Cl.
*G06Q 10/00* (2012.01)
*G06F 17/00* (2006.01)

(52) U.S. Cl.
USPC .............................................. 705/28; 705/26

(58) Field of Classification Search
USPC .......................................................... 705/28
See application file for complete search history.

(56) References Cited

U.S. PATENT DOCUMENTS

| | | | | |
|---|---|---|---|---|
| 5,963,134 A * | 10/1999 | Bowers et al. | ............. | 340/572.1 |
| 5,970,471 A | 10/1999 | Hill | | |
| 6,154,771 A * | 11/2000 | Rangan et al. | ................ | 709/217 |
| 6,273,338 B1 | 8/2001 | White | | |
| 6,541,100 B1 | 4/2003 | Williams et al. | | |
| 6,566,024 B1 | 5/2003 | Bourdelais et al. | | |
| 2002/0194051 A1 * | 12/2002 | Hall et al. | ........................ | 705/10 |
| 2003/0004816 A1 | 1/2003 | Byers, Jr. | | |
| 2003/0009392 A1 * | 1/2003 | Perkowski | ....................... | 705/26 |
| 2003/0154141 A1 | 8/2003 | Capazario | | |
| 2003/0195824 A1 | 10/2003 | Duffy | | |
| 2004/0181467 A1 * | 9/2004 | Raiyani et al. | .................. | 705/28 |
| 2005/0086117 A1 | 4/2005 | Kanisawa | | |

OTHER PUBLICATIONS

Feder, A., "A Look at Delicious Library 3.0 (images)," *Think Secret*, Aug. 3, 2004, <http://thinksecret.com/news/deliciouslibrary.html> [retrieved Jan. 19, 2005].

"A Look at Delicious Library 3.0 Overview," *Think Secret*, Aug. 3, 2004, <http://thinksecret.com/archives/images/deliciouslibrary/Overview.html> [retrieved Jan. 19, 2005].

"Visual Inventory Control," *Dynamic Control Software*, <http://dynamiccontrolsoftware.com>, publicly available prior to Jun. 9, 2004, [retrieved Jan. 19, 2005].

(Continued)

*Primary Examiner* — Garcia Ade

(74) *Attorney, Agent, or Firm* — Knobbe, Martens, Olson and Bear, LLP

(57) ABSTRACT

A system and method for a librarian facilitates appraising the value of all or selected products in a collection of products. The collection of products may be part of a library that includes one or more photographic images of the library, and an inventory of the products revealed in those images. The librarian facilitates appraising the value of products in the collection with reference to the images. Appraisals may be automatically updated, and users notified in accordance with user notification preferences. An automated referral may be provided to the user to sell all or selected ones of the appraised inventory of products, individually or together. An extended appraisal may be provided to facilitate enhancing the value of a collection in the library.

63 Claims, 21 Drawing Sheets

(56) References Cited

OTHER PUBLICATIONS

"Book Collector Book Inventory Software," Collectorz.com Book Collector, n.d., <http://www.collectorz.com/book/book_inventory.php?from=google&keyword=book_inv...> [retrieved Dec. 31, 2003].

"Book Collector Features," Collectorz.com Book Collector, n.d., <http://www.collectorz.com/book/features.php> [retrieved Dec. 31, 2003].

"Edge, Junction, and Corner Detection Using Color Distributions," *ACM Portal*, ACM, Inc. © 2004, <http://portal.acm.org/citation.cfm?id=505477&dl=ACM&coll=portal> [retrieved Feb. 24, 2004].

"Technology and Services," Advanced Records Management Services, Inc., n.d., <http://www.armsrecords.com/pg4.html> [retrieved Dec. 31, 2003].

"Visual Inventory Control Software," Dynamic Control Software, n.d. <http://www.dynamiccontrolsoftware.com> [retrieved Dec. 31, 2003].

\* cited by examiner

METHOD AND SYSTEM FOR APPRAISING A COLLECTION OF PRODUCTS

CROSS-REFERENCE TO RELATED APPLICATIONS

This application is a continuation-in-part of U.S. patent application Ser. No. 10/920,149, filed on Aug. 17, 2004 and entitled METHOD AND SYSTEM FOR A PERSONAL LIBRARIAN, which, in turn, is a continuation-in-part of U.S. patent application Ser. No. 10/864,291, filed on Jun. 9, 2004 and entitled METHOD AND SYSTEM FOR INVENTORY VERIFICATION, priority from the filing dates of both of which is hereby claimed under 35 U.S.C. §120. The subject matter of application Ser. Nos. 10/920,149 and 10/864,291 are expressly incorporated herein by reference.

FIELD OF THE INVENTION

The present invention is directed to methods and systems for appraising a collection of products.

BACKGROUND OF THE INVENTION

The information age has produced an explosion of media for people to enjoy, whether a book, a video or audiocassette, a CD, or DVD, including music, movies, and video games. Keeping track of which titles a consumer has in their media library can be challenging.

Systems to help home and other users catalog books, movies and other media are known in the art. For example, there are a number of proprietary database applications that help users create databases to store and manage information about their collections. The information may be typed in, or even scanned from a barcode that is affixed to the product, as is done in large scale inventory control systems for libraries or retailers. In at least one application, the information may be obtained from online sources, such as library or retailer web sites.

One of the problems with current systems is that they are typically standalone products that require manual entry of information about each title in a user's physical library or media inventory. The database resides on the user's computer, which can make it difficult to access remotely. The database may also not be readily transportable by the user. Moreover, the information in the database is only accurate and up-to-date if the user takes the time to maintain the database.

Another problem with known database catalogs is that there is no direct connection between the information about a particular title and its current physical location (e.g., in a bookcase(s), CD tower(s), etc.). In addition, the user's physical library may be distributed amongst multiple geographic locations (e.g., different rooms in a home, both at a home and an office, at multiple homes, etc.). Further, it may be difficult to ascertain the value of the products in a user's library.

SUMMARY OF THE INVENTION

To address the above-described problems and other shortcomings in the prior art, the present invention provides a method for a user to obtain an appraisal of all or selected products in a collection of products. The products in the collection may include products depicted in an image from which an inventory of the products has been generated.

Included is a method for updating the appraisal of the products, periodically or on demand, and notifying the user about the appraisal in accordance with the user's notification preferences.

In one aspect of the invention, an automated referral may be provided to the user to sell all or selected products in the appraised collection of products, individually or together. An appraisal interface may also be provided to, among others, facilitate the selection of products for which an appraisal is requested, including by product or by collection, link to the automated referral to sell the appraised products, indicate a condition of the products for which the appraisal is requested, including by product or by collection, display additional products that may be acquired to increase the appraised value of a collection, link to an interface to purchase the additional products, and indicate preferences for the frequency of and notification about the appraisal.

In another aspect of the invention, the collection of products may be inventoried as part of a library to which a user has access. The library's inventory may include one or more images of the products as they are stored in the library, and an inventory of the products revealed in those images. The library may include any type of product that is typically stored in a manner that reveals a side of the product or the product packaging that contains product identification information, such as books or CDs that are stored vertically or horizontally on a shelf to reveal the book spine or the title edge of the CD case, or any other type of product, either packaged or without packaging, which can be identified and inventoried. Certain embodiments of the invention may use methods for identifying and maintaining an inventory of products that are described in commonly assigned co-pending U.S. patent application Ser. No. 10/864,291, filed on Jun. 9, 2004, and entitled METHOD AND SYSTEM FOR INVENTORY VERIFICATION, the content of which is expressly incorporated herein by reference.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
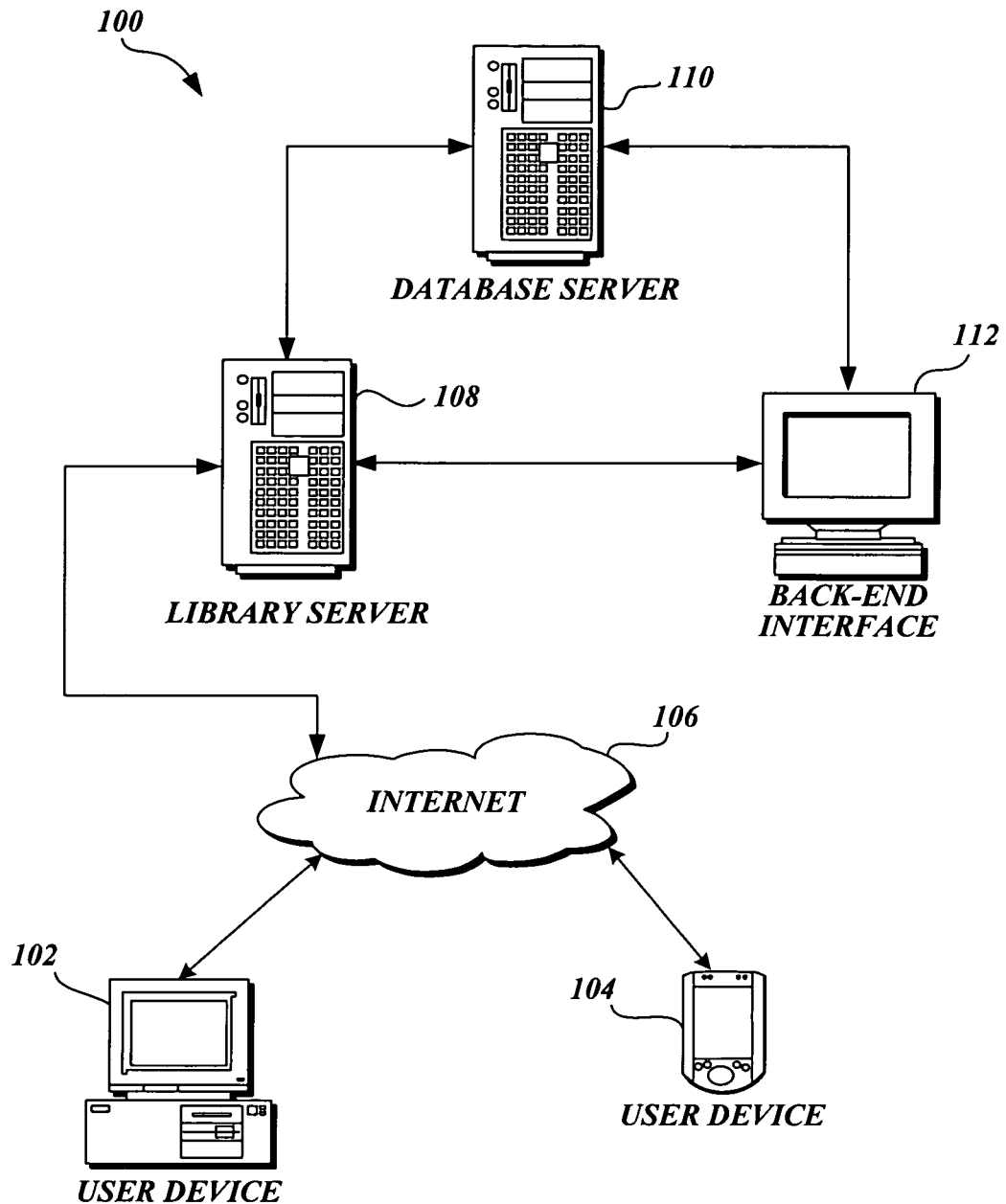
FIG. 1 is a pictorial diagram showing an exemplary operating environment for implementing a method and system for appraising products in a library in accordance with an embodiment of the invention.

FIG. 1 illustrates one environment for implementing an embodiment of the present invention. The environment shown includes a librarian system 100 with database and librarian servers that use images of products stored in a library to facilitate the maintenance of the library. The environment also includes various electronic user devices, such as a computer system 102 and a PDA 104 that individuals can use to communicate with the librarian system 100. In the environment shown in FIG. 1, the user devices 102, 104 communicate with the librarian system 100 via one or more computer networks, such as the Internet 106. Protocols and components for communicating via the Internet are well known to those of ordinary skill in the art of computer network communications. Communication between user devices 102, 104 and the librarian system 100 may also be enabled by local wired or wireless computer network connections.

The librarian system 100 depicted in FIG. 1 operates in a distributed computing environment comprising several computer systems that are interconnected via communication links, e.g., using one or more computer networks or direct connections. However, it will be appreciated by those of ordinary skill in the art that the system 100 could equally operate in a computer system having fewer or greater number of components than are illustrated in FIG. 1. Thus, the depiction of the librarian system 100 in FIG. 1 should be taken as exemplary, and not limiting to the scope of the invention.

The librarian system 100, as illustrated, includes a librarian server 108, a database server 110, and a back-end interface 112. Each of the servers 108 and 110 are described below in more detail. The back-end interface 112 allows an operator of the librarian system 100 to monitor and adjust the operation of the servers 108 and 110 as needed.

In brief, the librarian server 108 is generally responsible for providing front-end user communication with various user devices, such as devices 102 and 104. The front-end communication provided by the librarian server 108 may include generating user interfaces comprising text and/or graphics, possibly organized as a Web page using hypertext transfer protocols, for communicating images and information about the users' home libraries to and from the various user devices 102, 104.

In one suitable implementation, the librarian server 108 enables a user to upload images of products stored in a library to the database server 110. The library may comprise products stored for warehousing, retailing, reading, reference, lending, or any other purpose, and may even comprise products that are stored in separate physical locations, such as separate buildings, rooms, or shelves. From the images the librarian server 108 generates an inventory of the products depicted in the images, stores the images and inventory on the database server 110, and enables the user to view the images and inventory in an easy to use graphical user interface. In a typical embodiment, the inventory is generated as described in commonly assigned co-pending U.S. patent application Ser. No. 10/864,291, which was previously incorporated herein by reference. Through the interface, the user is given an opportunity to verify that the inventory accurately reflects the products stored in the library, as well as to view and locate products in the library online. In one embodiment, the images may be obtained from digital images of products stored in the library, e.g., on the bookshelves. The digital images may be actively uploaded on demand or passively uploaded at predetermined times directly to the librarian server 108. The uploaded images may be optionally stored in a database maintained by the database server 110.

In one embodiment, the inventory database stored in database server 110 includes information about various stored products, including (but not limited to) books, audiobooks (cassettes or CDs), music CDs, DVDs, or any other type of product that is capable of being stored in a library such that the product identification information is revealed on one or more sides of the product when captured in a photographic image of the stored product, and from which a visual identification of the product may be readily made. Typically, the product identification information includes any human-comprehensible text or other features that appear on a visible part of a product, such as a book spine, or the edge of a CD case, and that help to identify the product without machine intervention. For example the product identification information might include such information as the title, author, or performer, or a logo associated with an author or performer. In one embodiment, the inventory information included in the inventory database may be obtained directly from the product identification information revealed on the product as captured in the above-described photographic images using various text and feature recognition techniques. In one embodiment, the inventory information includes information that indicates a relative or absolute location of the product, or a combination of both. The relative location may be the location of a product as compared to other products captured in the image. The absolute location may be identified in a visible label affixed to the bookshelf or media storage unit depicted in the image. In some cases, the location may be represented by a filename associated with the image in which the product is depicted.

Alternatively, or in addition, the inventory information may be manually input by a user into the librarian server 108 by reading and entering the information in conjunction with an upload or display of the image of the stored product. For example, the location of products captured in the image may be the location of the bookshelf in a user's home as the user indicated when actively uploading the image using their digital camera, such as the living room, or den. As another example, the location of products captured in the image may the location of a bin in a warehouse, as automatically captured during a passive uploading of the image of the contents of the bin using an embedded camera. Regardless of how the information is obtained, whether actively or passively, or whether from the image itself or from information supplied with the image, or a combination of both, the inventory information may include various attributes that describe and identify the inventoried products, including (but not limited to) title, author/performer, publisher, and storage location. The inventory database may further include an index that enables the librarian server 108 to organize and present the inventoried products and corresponding images to a user according to one or more of these attributes. In a typical embodiment, the inventory information is generated or obtained as described in commonly assigned co-pending U.S. patent application Ser. No. 10/864,291, which was previously incorporated herein by reference.

The librarian server 108 further provides back-end inventory services in cooperation with the database server 110, including generating inventory transactions to update the information and attributes contained in the inventory database. The database server 110, as will be further described below, maintains the databases from which the librarian server 108 generates the user interfaces, including the above-described image and inventory databases.

Figure 2:
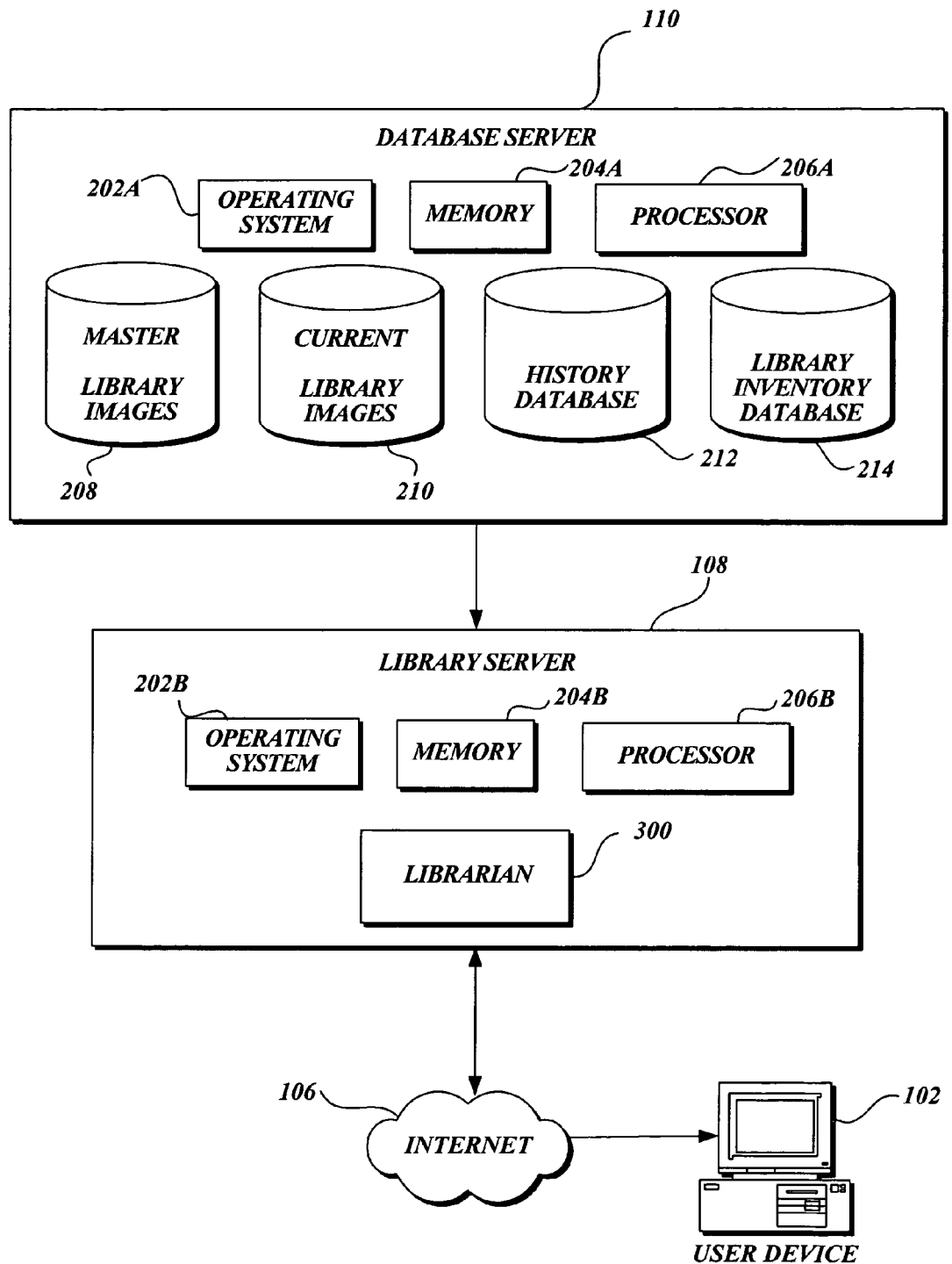
FIG. 2 is a block diagram depicting an arrangement of certain computing components for implementing an embodiment of a library appraisal system and method consistent with the operating environment depicted in FIG. 1.

FIG. 2 illustrates certain exemplary computing components that are responsible for the operation of the librarian system 100 shown in FIG. 1. The database server 110 includes a master library images database 208, a current library images database 210, a history database 212, and a searchable library inventory database 214. The master library images database 208 contains images that capture the stored products at a certain point in time and from which the inventory information has already been verified using the services of the librarian server 108. The current library images 210 contain new images of some or all of the same locations captured in the master images 208 of the library, but at a later point in time.

The history database 212 contains historical data relating to the purchasing history and behavior of the owner of the library. The historical data are used to complement the recognition of stored products when the images of the products are not of sufficient quality to recognize the products that they depict. Lastly, the inventory database 214 contains the product identification and storage location information that make up the inventory of the library. In one embodiment, the inventory database 214 contains product appraisal information associated with the inventory of the library, if any, including appraisals of individual products and appraisals of all or a subset of products taken together as a whole, i.e., a collection of products.

In one embodiment, the database server 110 is configured to receive instructions from the librarian server 108 and return images from the image databases 208, 210, as well as information from the inventory database 214. The images and inventory information enable the librarian server 108 to display to the user in an integrated manner the presence, location, and identification of books, CDs, and other products stored in the library for purposes of taking and verifying an inventory, determining whether a product is in inventory, and where it is located. For example, the librarian server 108 may display to the user an image of a bin or bookshelf superimposed with a graphic that points to the location of a product that is already present in the library. Since the latest available image of the product may be out-of-date, the graphic may point to the location where the product was when last captured in an image.

In the illustrated embodiment, the librarian server 108 and database server 110 are shown including an operating system 202B and 202A, respectively, that provide executable program instructions for the general administration and operation of the servers 108, 110. Suitable implementations for the operating systems 202B and 202A are known or commercially available, and are readily implemented by persons having ordinary skill in the art, particularly in light of the disclosure herein. Those of ordinary skill in the art will recognize that the librarian server 108 and database server 110 will also typically employ a memory 204B and 204A, respectively, and processor 206B and 206A in which program instructions are stored and executed for operation of the servers. The librarian server 108 further includes computer program instructions for implementing a librarian 300 that operates in cooperation with the database server 110 to facilitate the maintenance of a library. Likewise, the database server 110 further includes executable program instructions for maintaining and updating the databases 208, 210, 212, and 214, and responding to requests received from the librarian server 108.

For the sake of convenience, much of the description herein is provided in the context of maintaining an inventory of books in a library, but it should be well understood that the description herein is also applicable to facilitating the maintenance of an inventory of CD and DVD products, as well as other media and non-media products that can be stored in various commercial or private environments, such as a warehouse, a retail store, a lending library, public or private, or a user's home. References herein to specific types of products, such as books, audiobooks, etc., are only illustrative and do not serve to limit the general application of the invention.

Figure 3:
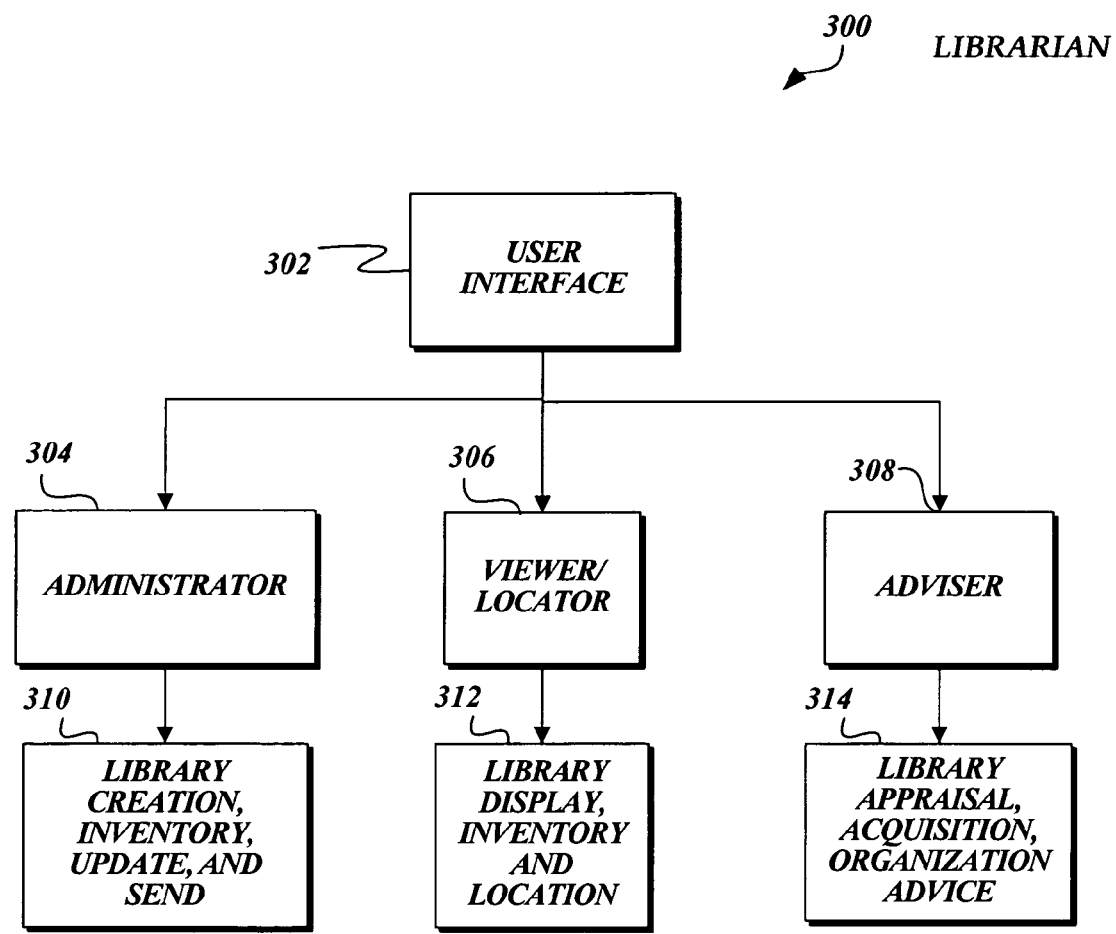
FIG. 3 is a block diagram depicting an arrangement of functional components for implementing an embodiment of a library appraisal system and method consistent with the operating environment and computing components shown in FIGS. 1 and 2.

FIG. 3 is a block diagram depicting an arrangement of certain exemplary functional computing components for implementing the librarian 300, as shown and described in the illustrated embodiment with reference to FIGS. 1 and 2. The librarian 300 includes, among others, a process for a user interface 302 to generate a user-friendly graphical user interface for use when maintaining a library, as will be described in further detail with reference to FIGS. 5-15.

In one embodiment, the librarian 300 further includes an administrator 304 that is responsible for administrative functions 310 such as library creation, inventory taking, library update, and sharing the library with others via email or other communications medium. The librarian 300 may further include a viewer/locator 306 process that is responsible for functions 312 of generating and displaying a view of the library images and inventory to a user in response to a request from a user to view, verify, change, or otherwise use the inventory information derived from the images, and to locate particular items of inventory by searching for search terms that may appear in the inventory information associated with an item in the library. In one embodiment, the function 312 of generating and displaying a view of the library to the user in response to the user's request includes a function 312 that will serve to restrict searching the library to a particular collection of the library. A collection is an arbitrary grouping of one or more items of inventory in the library as defined by the user.

The librarian 300 may further include an adviser process 308 that is responsible for performing functions 314 such as appraisals of all or selected products in a collection of products stored in a library, making acquisition recommendations based on the inventory of the library to enhance the library in some manner, including increasing an appraised value of a collection of products in the library, and further making organization recommendations, also based on the inventory of the library as well as any current organization, e.g., the user's collection designations, where a collection is defined as an arbitrary grouping of one or more items of inventory in the library.

FIGS. 4A-4E are flow diagrams describing one embodiment of a librarian process 400 that enables an implementation of a librarian system 100, as illustrated in FIGS. 1-3. Beginning with reference to FIG. 4A, at process block 402, the librarian process 400 displays a librarian user interface, examples of which are illustrated in detail below with reference to FIGS. 5-15, each of which illustrate a browser program 500 displaying Web pages in which a user is able to interface with the librarian 300 in accordance with an embodiment of the present invention. The Web pages may be generated by the librarian server 108 and delivered to the user's computing device 102, 104 via the Internet 106.

Figure 4A:
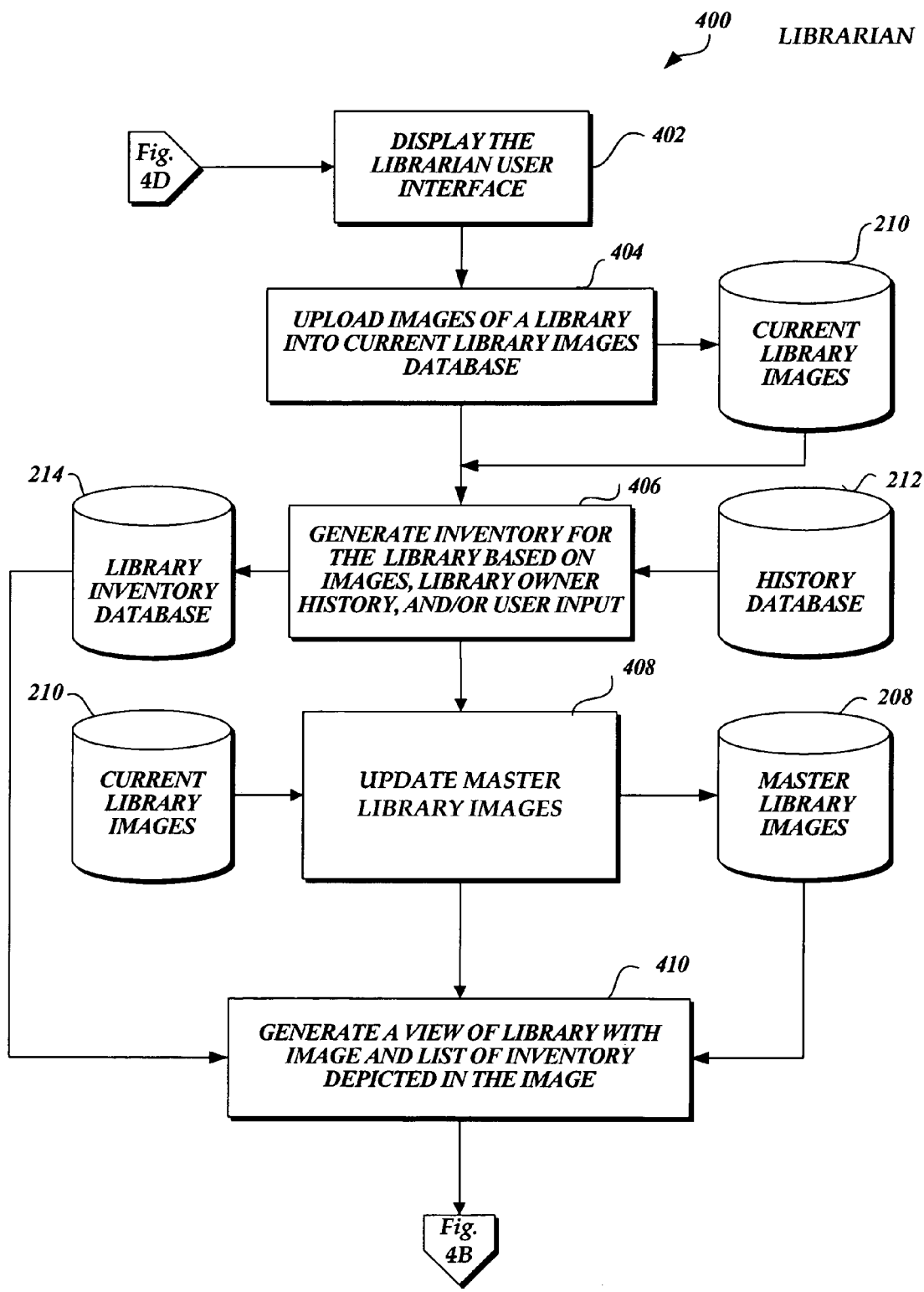
FIGS. 4A-4E are flow diagrams a library appraisal method formed in accordance with an embodiment of the present invention.
Figure 5:
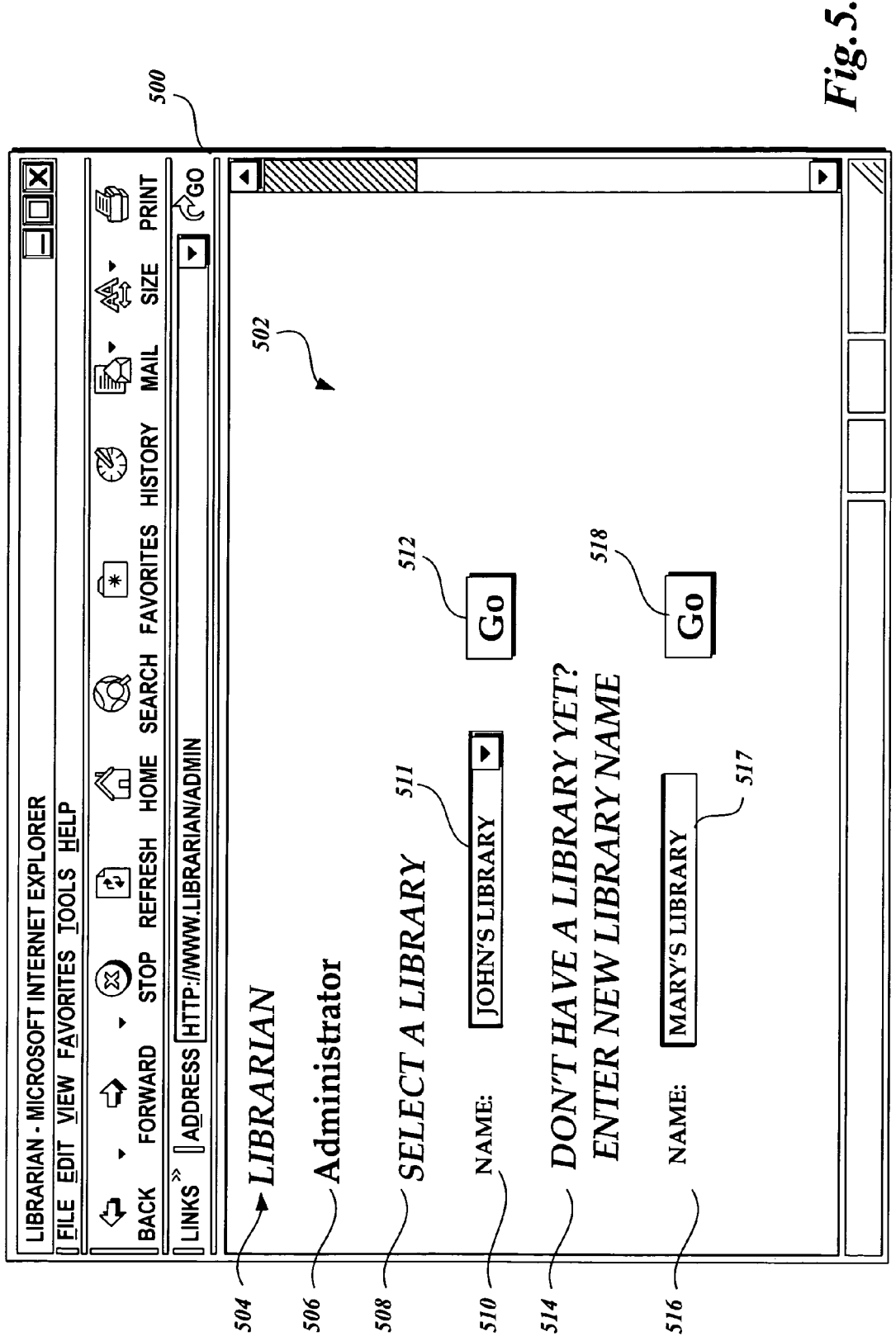
FIG. 5 depicts a browser program with an example Web page presenting a librarian administrator interface to a user in accordance with an embodiment of the invention.

With reference to FIG. 4A and FIG. 5, the process 400 initially displays, at process block 402, an administrator Web page 502 in which a user is able to select an existing library or to create a new library. In the illustrated example in FIG. 5, the administrator Web page 502 includes a title "The Librarian" and a subtitle "Administrator" at reference numerals 504 and 506, respectively, to identify the page function, along with two options, "Select a Library," at reference numeral 508, and "Enter New Library Name," at reference numeral 514. For the "Select a Library" option 508, the user is prompted to enter an existing library name at reference numeral 510, in this case by pulling down the list of existing library names at reference numeral 511, and selecting the desired name, here "John's Library." For the "Enter New Library Name" option 514, the user is prompted to enter a new library name at reference numeral 516 in text box 517, here "Mary's Library." Once the name has been supplied, the user is prompted to enter "GO" in command buttons at reference numerals 512, 518, respectively, to branch to the next Web page, illustrated in FIG. 6.

Figure 6:
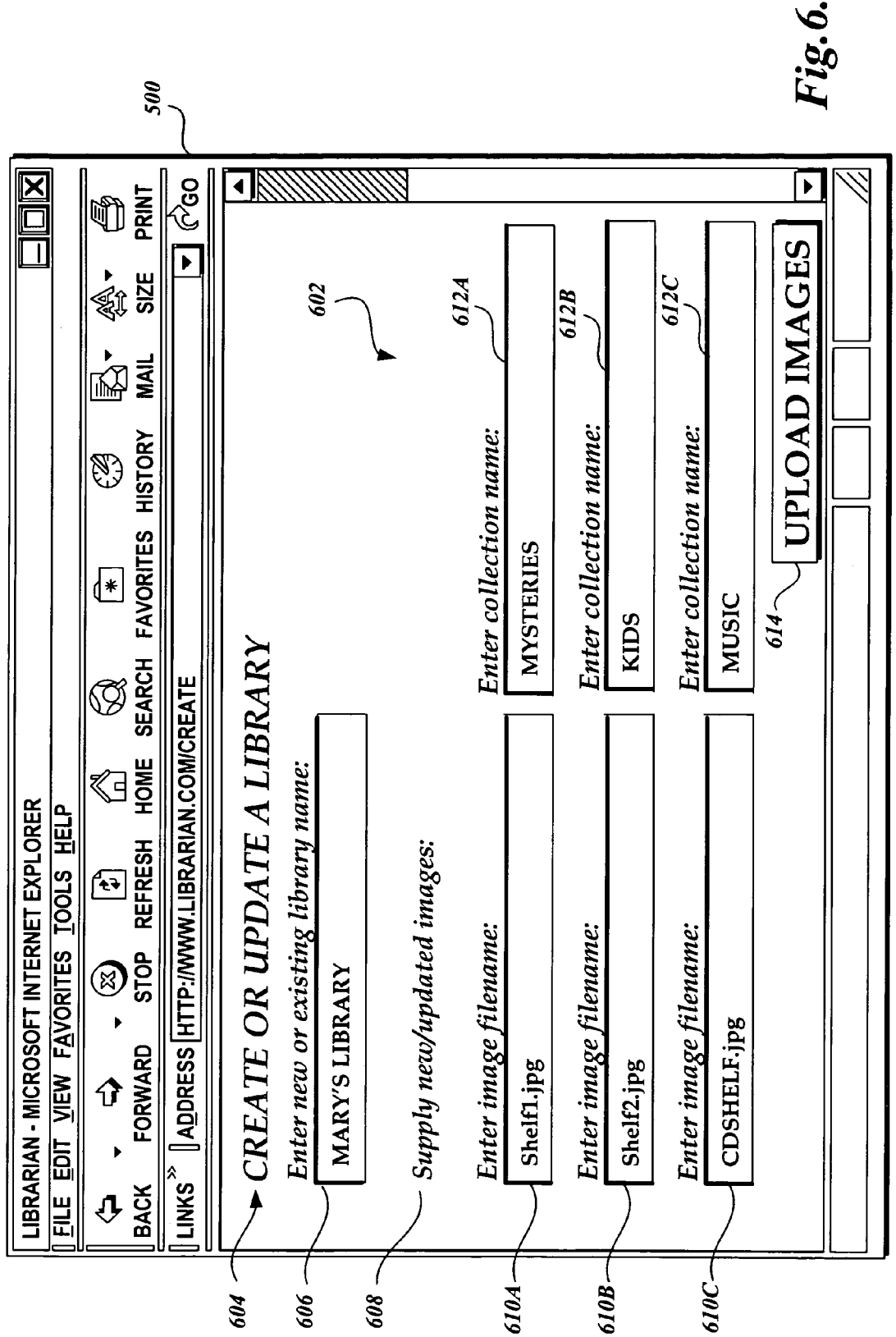
FIG. 6 depicts a browser program with an example Web page presenting a librarian create/update interface to a user in accordance with an embodiment of the invention.

Continuing now with the description in FIG. 4A, at process block 404, the librarian process 400 uploads images of a library into the current library images database 210 to be stored on the database server 110 using the example Web page interface illustrated in FIG. 6. The Web page interface includes a create Web page 602, identified here with the title "Create or Update A Library" at reference numeral 604, to receive user input for creating or updating a library, beginning with the prompt "Enter new or existing library name" and accompanying text box 606, in this example "Mary's Library." At reference numeral 608, the user is further prompted to "Supply new/updated images" with multiple input areas 610A-C, and 612A-C, in which to enter the image filename and, optionally, a collection name that the user wishes to use to identify the subset of books, CDs, etc. that that comprise a collection, and happen to be stored on the particular bookshelf or other storage unit depicted in the image stored in the file designated by the corresponding filename. In the illustrated example in FIG. 6, the user has entered the filename "Shelf1.jpg" at reference numeral 610A and a collection name of "Mysteries" at reference numeral 612A, the filename "Shelf2.jpg" at reference numeral 610B and a collection name of "Kids" at reference numeral 612B, and the filename "CDSHELF.jpg" at reference numeral 610C and a collection name of "Music" at reference numeral 612C. Greater or fewer filenames and corresponding collection names may be entered, depending on how many images the user wishes to upload. Although the image filenames in the illustrated example are all files of type ".jpg" indicating a JPEG type of image file, other kinds of image file formats may be used, e.g., TIFF, BMP, etc.

Once the filenames of the images have been supplied along with any of the optional collection names, the user is further prompted to upload the images into his or her library, the name of which was input at reference numeral 606, at command button labeled "UPLOAD IMAGES" at reference numeral 614. Activating the command button "UPLOAD IMAGES" at reference numeral 614 will cause the librarian process 400 to begin the process of uploading the images to a new or existing library in the current library images database 210 as explained in further detail below.

Continuing now with the description in FIG. 4A, at process block 406, the librarian process 400 generates inventory to be stored in the library inventory database 214 for the library named in text box 606 in FIG. 6. The generation of the inventory is based primarily on the identification information revealed in the images that were uploaded to the current library images database 210 at process block 404. In a typical embodiment, the inventory is generated as described in commonly assigned co-pending U.S. patent application Ser. No. 10/864,291, which was previously incorporated herein by reference. For example, in one embodiment, the product identification information may include various distinguishing attributes of the product or the product's packaging. The attributes may include text, e.g., author, performer, title, publisher, ISBN number, etc., graphics, e.g. cover artwork, logo, typeface, etc., and/or physical characteristics, e.g., product dimensions, shape, color, reflectivity, etc., with or without packaging, however the product is stored. Generating the inventory from the product identification information may include recognizing the product identification through the heuristic application of one or more recognition techniques to the image in an effort to resolve ambiguities and improve the reliability of the recognition without having to resort to manual efforts to determine what products are stored on a particular shelf or location. The recognition techniques include the application of text recognition or other optical character or feature recognition techniques to the attributes contained in the product identification information, e.g., the product's text, graphics, and/or other physical characteristics.

In one embodiment, since the image or images of the library may include more than one product stored in a particular location, in one embodiment recognizing the product identification may employ various pattern recognition techniques known in the art, such as edge detection, to first isolate a portion of the photographic image before attempting to recognize the product identification, where the isolated portion of the image is of a single product stored in the location. In addition, the method for recognizing the product identification may rotate the image in different orientations prior to the application of the recognition technique so as to maximize the chances of recognizing products stored in different orientations, e.g., horizontal, vertical, or somewhere in between.

In one embodiment, recognition of the product identification may be achieved through comparison to a reference image of the product. This is particularly useful when the received photographic image, or isolated portion of the image, carries insufficient detail for proper recognition or is otherwise deficient, such as when the storage location is in partial shadow, improperly lighted, or where the stored products are worn or used such that the appearance of the distinguishing attributes comprising the product's identification information has deteriorated. The reference image typically includes a complete reference identification of a product, such as an image of a book spine complete with title and author, and in some cases may be obtained from a photographic image or digital scan of the product carried out especially for that purpose when the item is initially unboxed and added to inventory. The reference image may be further inferred from an image of the product that includes that portion of the image that is to be used as the reference image, such as when the reference image is an image of the spine of a book that has been inferred from one or more images of the book's front and back covers.

In one embodiment, recognizing the product identification revealed on one or more sides of the product as captured in the photographic image may rely on a previous recognition of that product, i.e., the method is self-learning. For example, the reference image may be obtained from previously-received photographic images of the product from which accurate recognition was achieved. Comparison to such a reference image may increase the reliability of recognition when receiving subsequent photographic images that include the product in question.

In one embodiment, should the identification information revealed in the images be inadequate to fully recognize the identity of the books, CDs, etc. depicted in the images, the librarian process 400 consults historical data obtained from the history database 212 to determine whether there exists any information associated with the user that provides a hint as to the identity of the books, CDs, etc. depicted in the image. The historical data may be any data gathered about the user with respect to the contents of his or her library. For example, the historical data may provide information as to the identity of books and CDs that the user has purchased in the past, or the genres that the user is most likely to have in their library.

After exhausting attempts to recognize products directly from the uploaded photographic image, either alone or in combination with a reference image or a hint present in the historical data, recognition may be achieved through display of the image of the home library to the user and prompting him or her to resolve any remaining ambiguities in recognizing the identification of the product by entering the product identification information, such as author, title, etc., as necessary. The entered product identification information is associated with the uploaded photographic image of the product, thereby further increasing the chances of accurate recognition when receiving subsequent uploaded photographic images that include the product in question.

Figure 7:
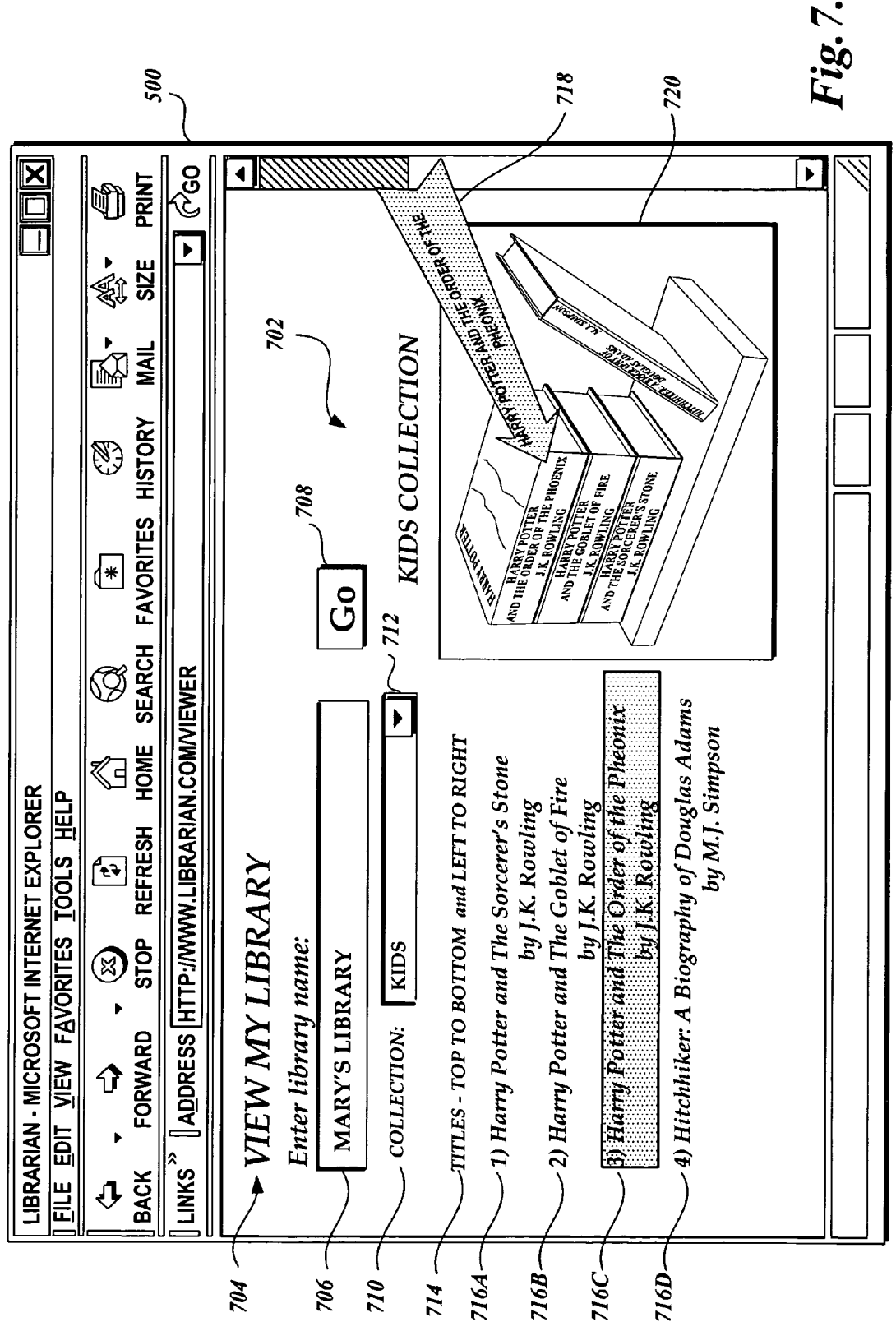
FIG. 7 depicts a browser program with an example Web page presenting a librarian viewer interface to a user in accordance with an embodiment of the invention.

Continuing now with the description in FIG. 4A, at process block 408, the librarian process 400 updates the master library images database 208 with the current library images 210. Any previous images of the library may be archived or discarded. At process block 410, the librarian process 400 generates a view of the library, the view comprising a display of the images of the library as stored on the master library images database 208, in conjunction with the list of the inventory depicted in the image as stored on the library inventory database 214. An example of the view generated by the librarian process 400 at process block 410 is illustrated in FIGS. 7 and 9, with FIG. 7 illustrating a view of the "Kids" collection in "Mary's Library" before any corrections to the inventory data as described in FIG. 8 (and process block 412 in FIG. 4B, below), and FIG. 9 illustrating the same view after corrections. Specifically, FIGS. 7 and 9 illustrate an example Web page interface for a library viewer, including a viewer Web page at reference numerals 702, 902, identified here with the title "View My Library" at reference numeral 704, 904. The viewer Web page 702, 902 further includes a prompt to enter the library name in the accompanying text box 706, 906, in this example "Mary's Library." At reference numeral 708, 908, is a command button labeled "GO," which, when activated, will cause the librarian process 400 to display an image associated with Mary's Library, as well as the inventory information corresponding to the image. In the illustrated example, at reference numeral 710, 910, the user is further prompted to select from a drop-down box at reference numeral 712, 912, the name of the collection in "Mary's Library" that the user would like to view, in this example the "Kids" collection. After the selection has been made, the image from the master library images database 208 associated with the "Kids" collection of "Mary's Library" is displayed at reference numeral 720, 920. Alongside the display of the image, the librarian process 400 further displays the corresponding inventory information as obtained from the library inventory database 214, here entitled "Titles—Top to Bottom and Left to Right" at reference numeral 714, 914, followed by the inventory information identifying the titles "Harry Potter and the Sorcerer's Stone" at reference numeral 716A, 916A "Harry Potter and the Goblet of Fire" at reference numeral 716B, 916B "Harry Potter and the Order of the Pheonix" [sic], at reference numeral 716C (corrected at reference numeral 916C), and "Hitchhiker: A Biography of Douglas Adams," at reference numeral 716D, 916D.

Returning now to FIG. 4B, the librarian process 400 continues at process block 412 to update, correct, and reorganize the inventory in response to user input to the viewer interface generated at process block 410. In the illustrated viewer interface in FIG. 7, the user has selected the third Harry Potter title at reference numeral 716C, "Harry Potter and the Order of the Pheonix," [sic] to correct the error in the spelling of Phoenix, as further described below. As shown in the illustrated example, when the user selects a particular title, the images appearing at reference numerals 720, 920 are overlaid with a graphic 718, 918 that calls attention to the location in the image of the selected title as described in further detail with reference to process block 416 in FIG. 4B. In this example, the graphic 718, 918 is an arrow that contains the title of the selection, and whose endpoint clearly points to the selected title.

Figure 8:
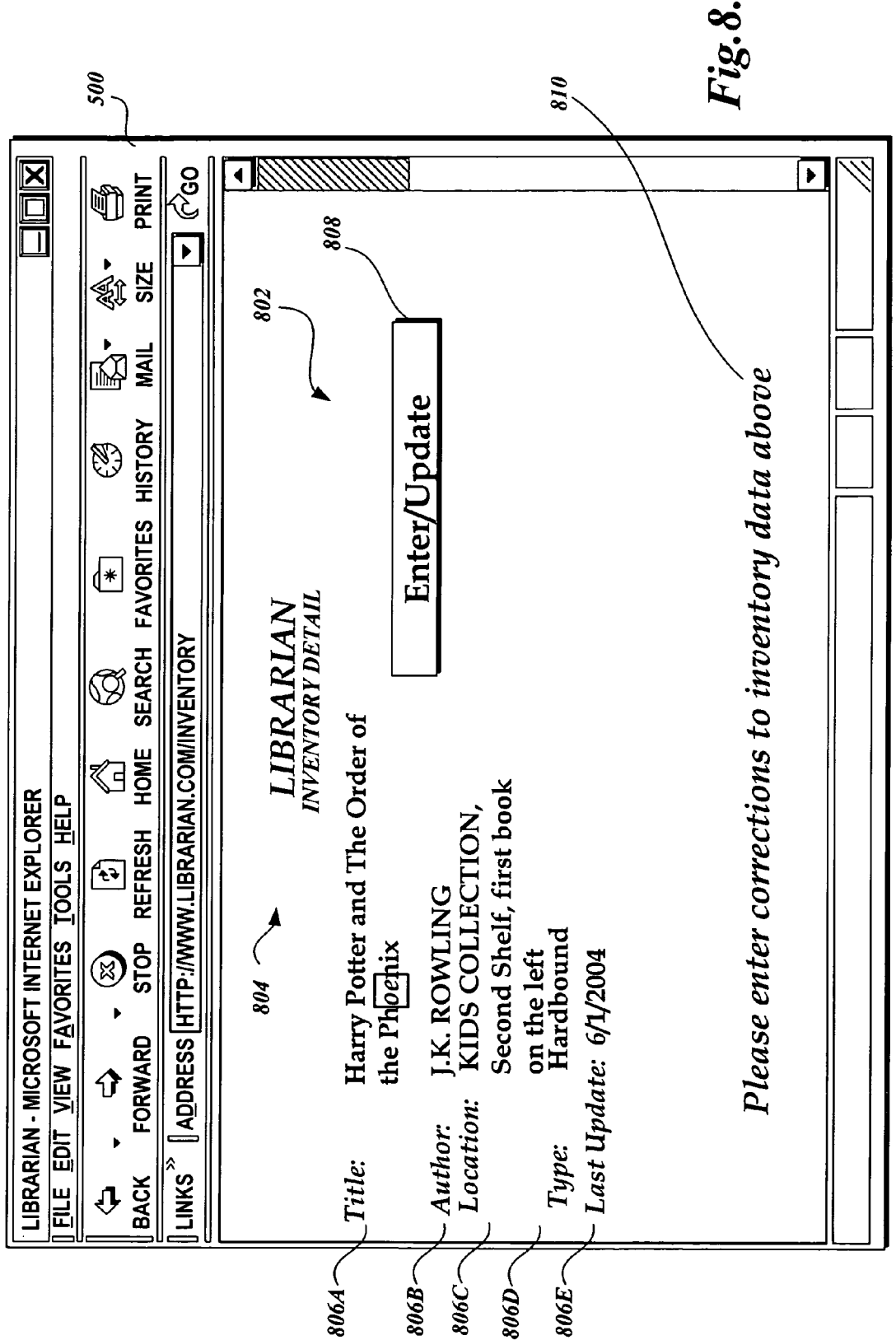
FIG. 8 depicts a browser program with an example Web page presenting a librarian inventory interface to a user in accordance with an embodiment of the invention.
Figure 9:
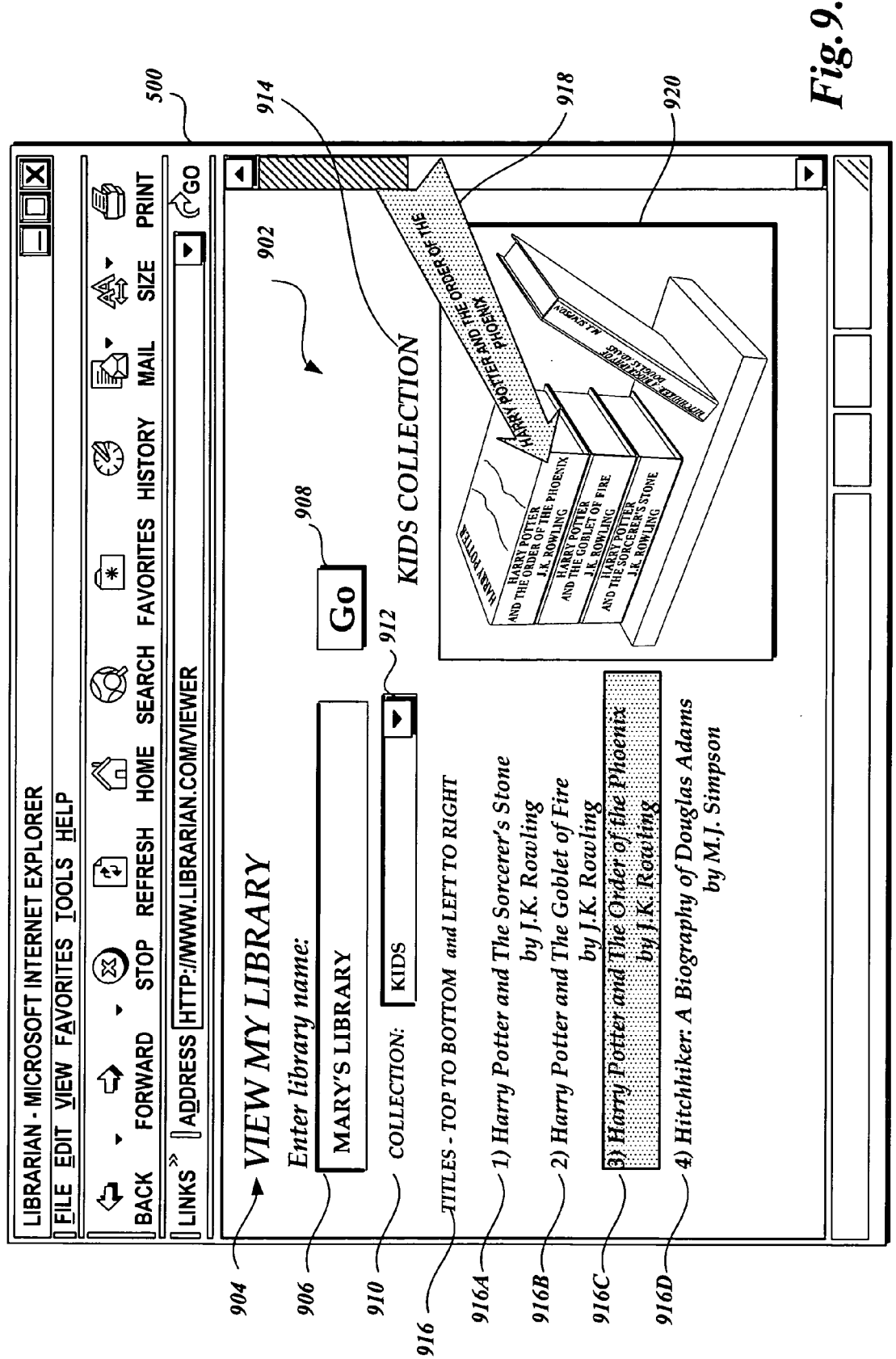
FIG. 9 depicts a browser program with an example Web page presenting a librarian viewer interface to a user in accordance with an embodiment of the invention illustrating an updated inventory from FIG. 8.
Figure 10:
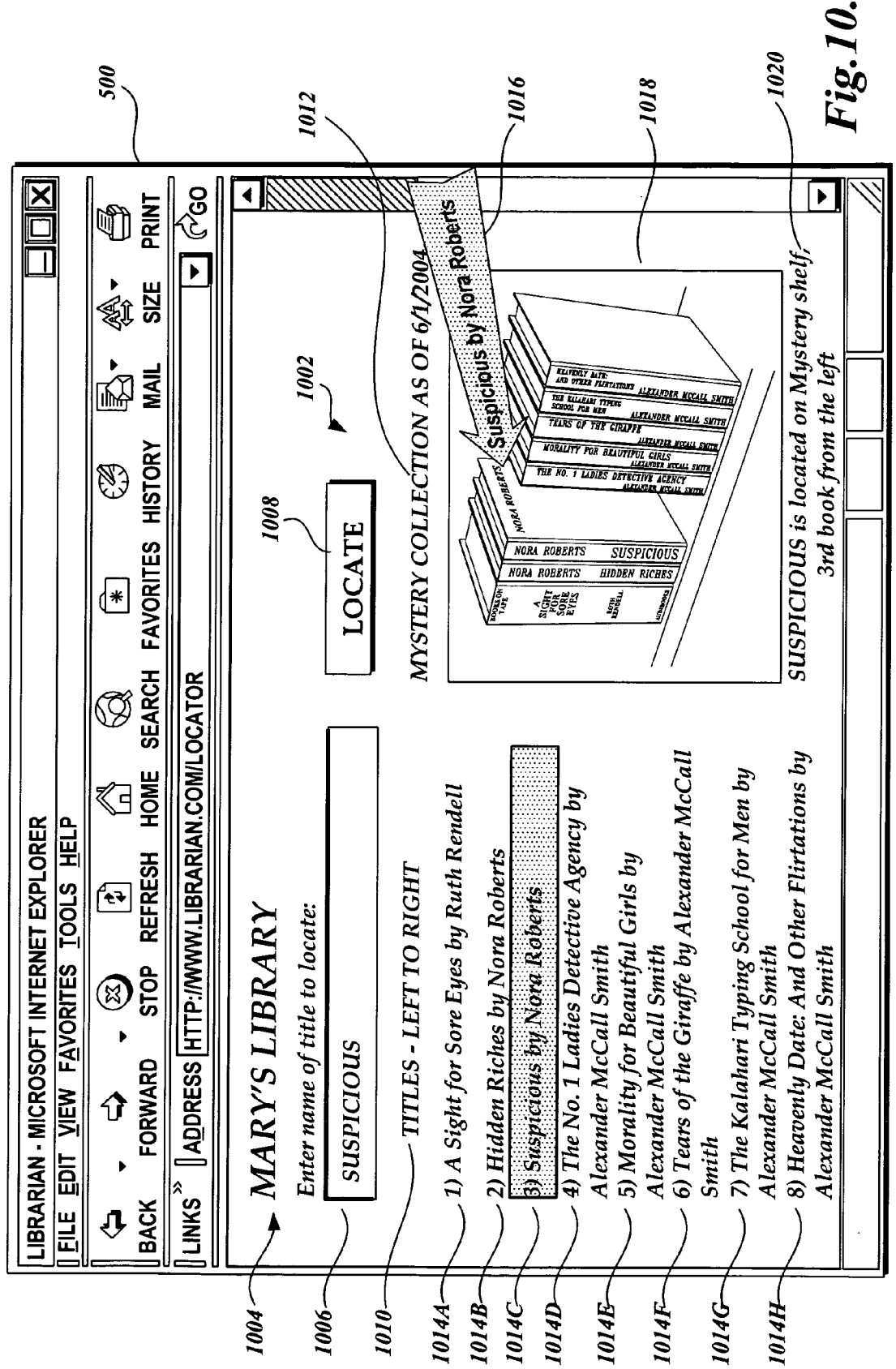
FIG. 10 depicts a browser program with an example Web page presenting a librarian locator interface to a user in accordance with an embodiment of the invention.

Continuing now with process block 412, once a particular title in the library has been selected, the user may navigate to a detailed inventory interface as illustrated in FIG. 8. FIG. 8 illustrates an example Web page interface for a library inventory at reference numeral 802, identified here with the title "Librarian Inventory Detail," at reference numeral 804, followed by identification information obtained form the library inventory database 214, here including the title at reference numeral 806A, "Harry Potter and the Order of the Phoenix," the author at reference numeral 806B, "J. K. Rowling," the location at reference numeral 806C, "Kids Collection, second shelf, first book on the left," the book type at reference numeral 806D, "Hardbound," and the date of the last update at reference numeral 806E, "Jun. 1, 2004." The user is prompted to "Please enter corrections to inventory data above," at reference numeral 810, and is further provided with a command button at reference numeral 808 that is labeled "ENTER/UPDATE." Activating the command button 808 causes the librarian process 400 to update the library inventory database 214 with the edited input as it appears on the Web page inventory interface 802. In this example, the user has re-entered the title to correct the spelling of "Phoenix." The user may also choose to reorganize the contents of their library by updating the location and collection designations associated with the title. Reorganizing the contents of the library is discussed in further detail with reference to process block 434 in FIG. 4D and FIG. 15 below.

Returning now to FIG. 4B, the librarian process 400 continues at process block 414 to search for locate particular products, e.g., particular titles, in the library in response to the entry by the user of a search term, and at process block 416, to display a located product with the image depicting the product, a graphic overlaid on the image, and/or a textual description of the location of the product in the library. In the illustrated locator interface 1002 illustrated in FIG. 10, the user has selected the library named "Mary's Library" at reference numeral 1004 in which to search for products containing the search term "SUSPICIOUS" as entered in text box 1006, to locate the Nora Roberts mystery entitled "Suspicious." When the user activates the command button labeled "LOCATE" appearing at reference numeral 1008, the librarian process 400 commences a text search of the inventory information contained in the library inventory database 214 for "Mary's Library," to determine whether there are any items in inventory containing the search term "SUSPICIOUS." In one embodiment, the librarian 400 restricts the text search of the inventory information to a particular subset of the inventory, such as a particular subset of the inventory belonging to a collection, e.g., the "Mystery" collection. The particular subset within which to restrict the search includes subsets identified as collections as specified by a user before or during the uploading of an image to a library. The particular subset within which to restrict the search may also include subsets identified as collections during an update or reorganization of the identified as collections during an update or reorganization of the library. In the illustrated example, the title "SUSPICIOUS" is found in the "Mystery" collection in "Mary's Library." The library. In the illustrated example, the title "SUSPICIOUS" is found in the "Mystery" collection in "Mary's Library." The librarian process 400 displays the corresponding image at reference numeral 1018 of the bookshelf entitled the Mystery collection at reference numeral 1012, and superimposes a graphic in the form of a location arrow at reference numeral 1016 to point out the location of the title on the bookshelf (or, at least, the location of the book at the time that the image was taken). To the left of the image is displayed a list of inventory captured in the image, the list captioned "Titles—Left to Right" at reference numeral 1010 to indicate that the list corresponds to the appearance of the titles on the bookshelf in order from left to right. The caption 1010 is followed by the inventory information obtained from the library inventory database 214, here listed as "A Sight for Sore Eyes by Ruth Rendell" at reference numeral 1014A, "Hidden Riches by Nora Roberts" at reference numeral 1014B, "Suspicious by Nora Roberts" at reference numeral 1014C, "The No. 1 Ladies Detective Agency by Alexander McCall Smith" at reference numeral 1014D, "Morality for Beautiful Girls by Alexander McCall Smith" at reference numeral 1014E, "Tears of the Giraffe by Alexander McCall Smith" at reference numeral 1014F, "The Kalahari Typing School for Men by Alexander McCall Smith" at reference numeral 1014G, and "Heavenly Date: And Other Flirtations by Alexander McCall Smith," at reference numeral 1014H. In addition to calling out the location of the title in the image with the location arrow at reference numeral 1016, the librarian process 400 may also highlight the listing of the inventory information associated with the located title as illustrated in the highlighting appearing around the listing of "Suspicious by Nora Roberts," at reference numeral 1014C. In one embodiment, the location of the title is also described in text, as illustrated in the example text "SUSPICIOUS is located on Mystery shelf, 3rd book from the left," appearing at reference numeral 1020, below the image 1018.

Figure 4B:
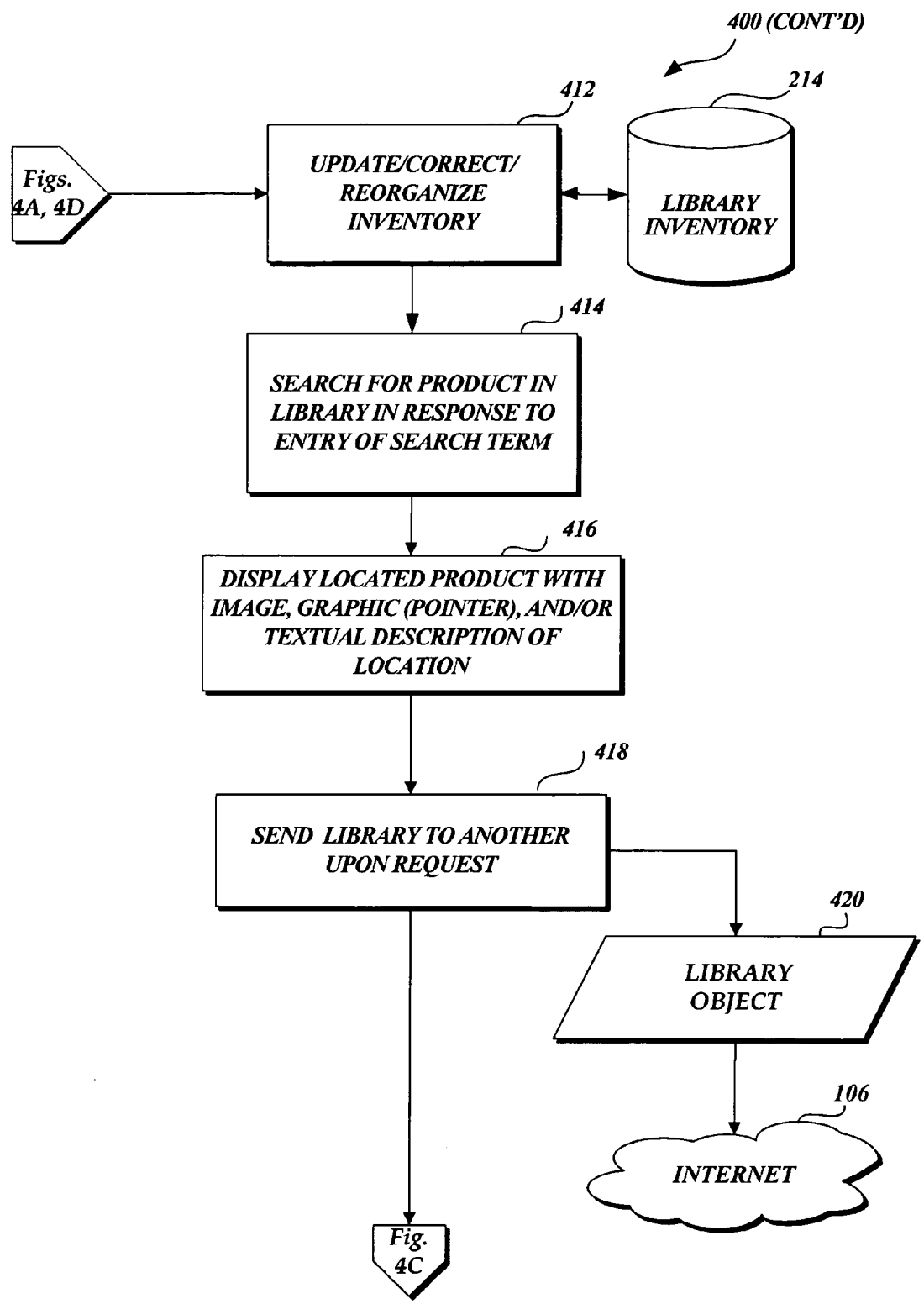

Returning now to FIG. 4B, the librarian process 400 continues at process block 418, to allow the user to send the library to another user upon request. As illustrated in FIG. 4B, the process of sending the library to another user includes generating a library object at reference numeral 420, where the library object is a file that contains the image or images that comprise the library, as well as the inventory information derived from those images, and possibly corrected, changed, and/or added during user interaction with the librarian 300.

The library object 420 is typically in a file format that allows the object to be attached to an electronic mail message for sending to another user via the Internet 106, e.g., attached to a message "Here's my bookshelf!" The user receiving the library object 420 may open it to browse the sender's library using the view interface of the library as described with reference to process block 410 in FIG. 4A, and as illustrated with reference to FIGS. 7 and 9. In one embodiment, the library object 420 is self-executing so that it may operate on any number of client devices 102 even though the device has no access to the library and database servers 108, 110.

Figure 11:
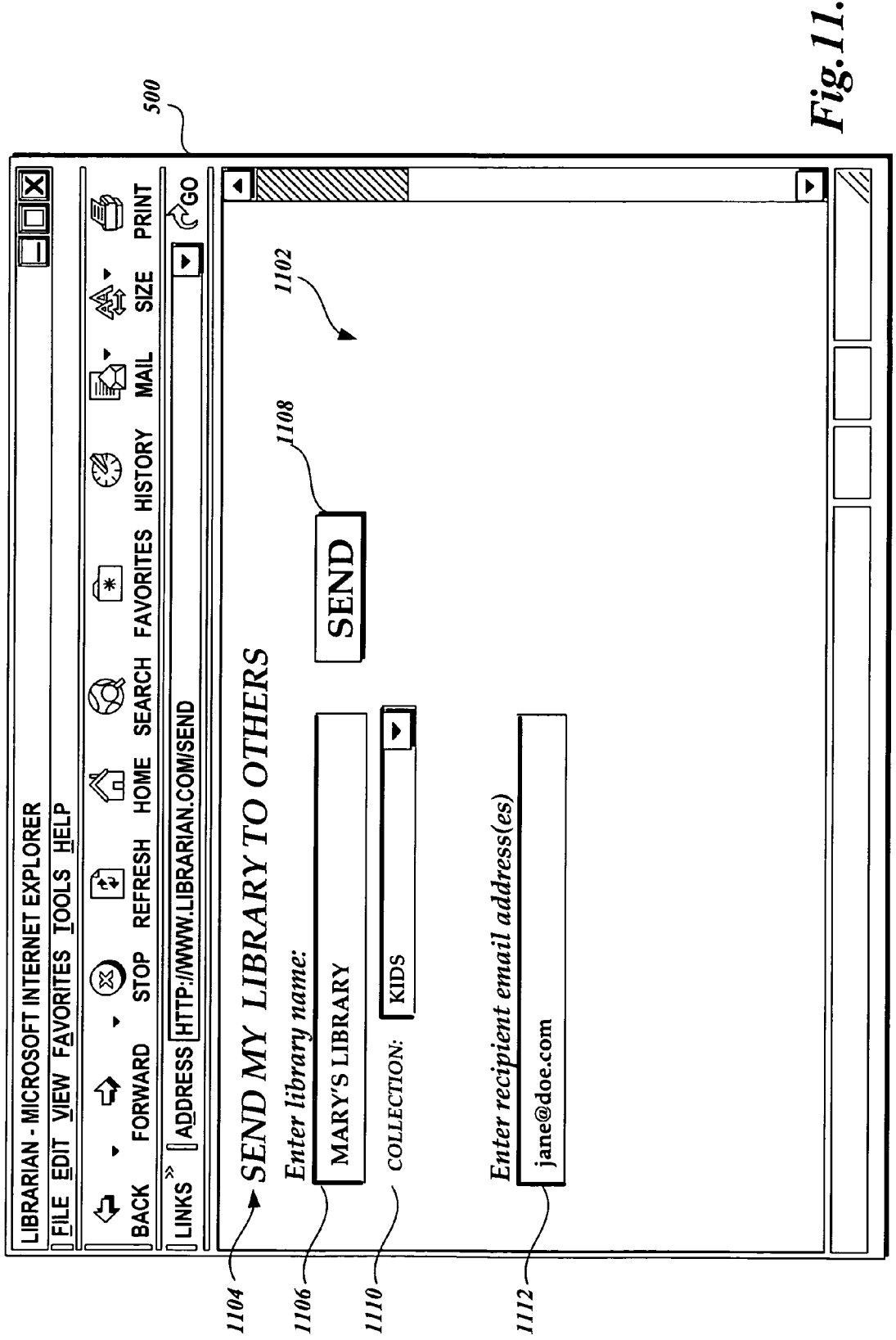
FIG. 11 depicts a browser program with an example Web page presenting a user interface to a user to send a library to another user in accordance with an embodiment of the invention.
Figure 12:
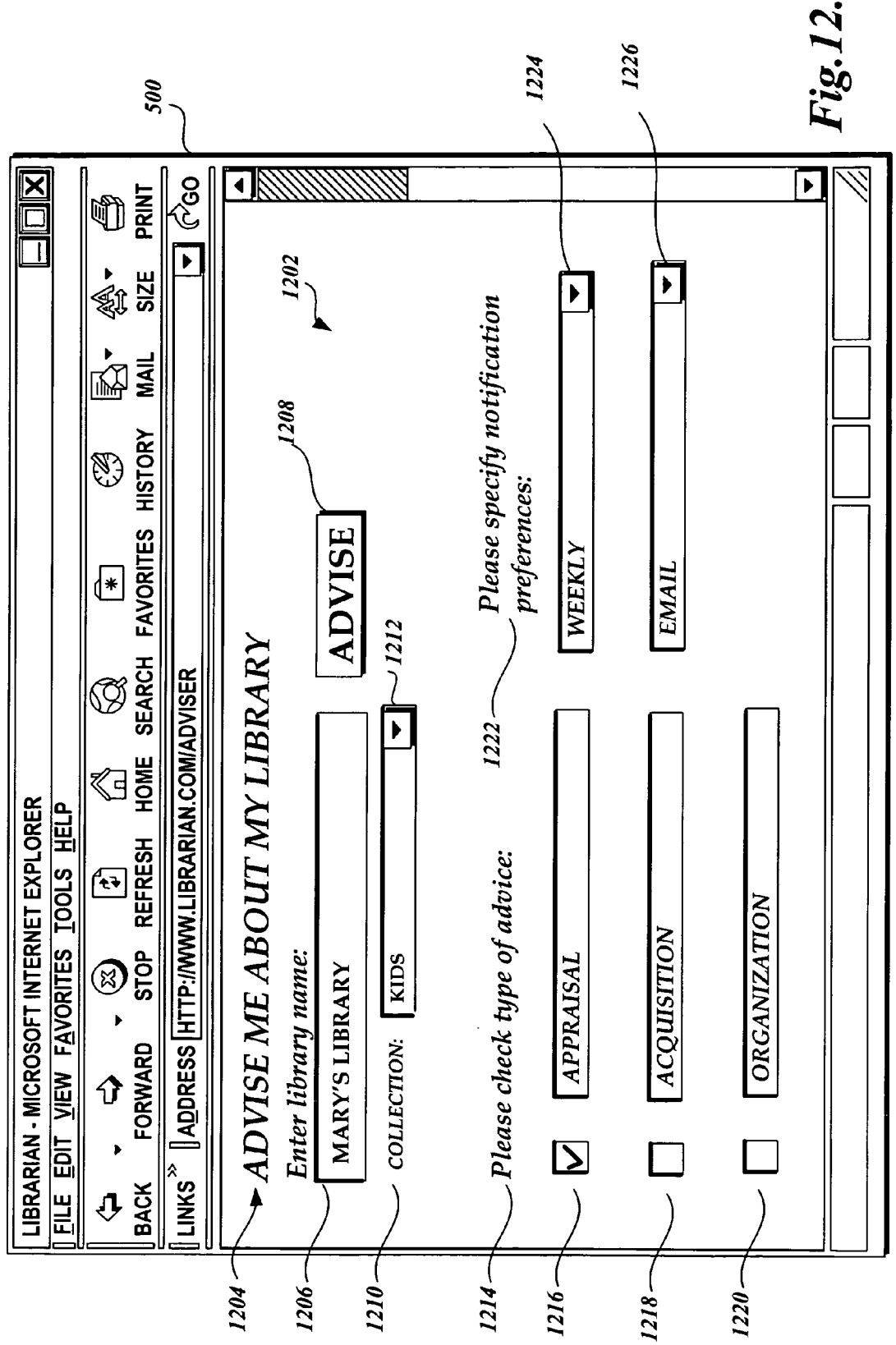
FIG. 12 depicts a browser program with an example Web page presenting a librarian adviser interface to a user in accordance with an embodiment of the invention.

In the illustrated send interface 1102 in FIG. 11, entitled "Send My Library to Others" at reference numeral 1104, the user has entered the library named "Mary's Library" in a text box at reference numeral 1106, and optionally a collection within the library, here entered in a text box at reference numeral 1110 as the "Kids" collection. The user is further prompted to enter in a text box appearing in reference numeral 1112, a recipient email address of the other user to whom the library is to be sent, in this example entered as "jane@doe.com." The librarian process 400 further provides a command button at reference numeral 1108 labeled "SEND," which, when activated, will cause the process 400 to prepare to send the library to the other user. In one embodiment, sending the library may include packaging the specified library, or collection from the library, into an object that comprises the image or images and inventory associated with the images, where the object is capable of transport to another user on another computer, in this case to the email addressee "jane@doe.com." In an alternate embodiment, the "SEND" button will cause the process 400 to generate or obtain a pointer to the specified library, or collection from the library, and to send or otherwise notify the other user that the pointer may be used to access the library. It should be understood that the example in FIG. 11 is provided for the sake of illustration only. Other means of communication besides electronic mail, objects, and pointers may be used to provide access to a library to another user.

Figure 4C:
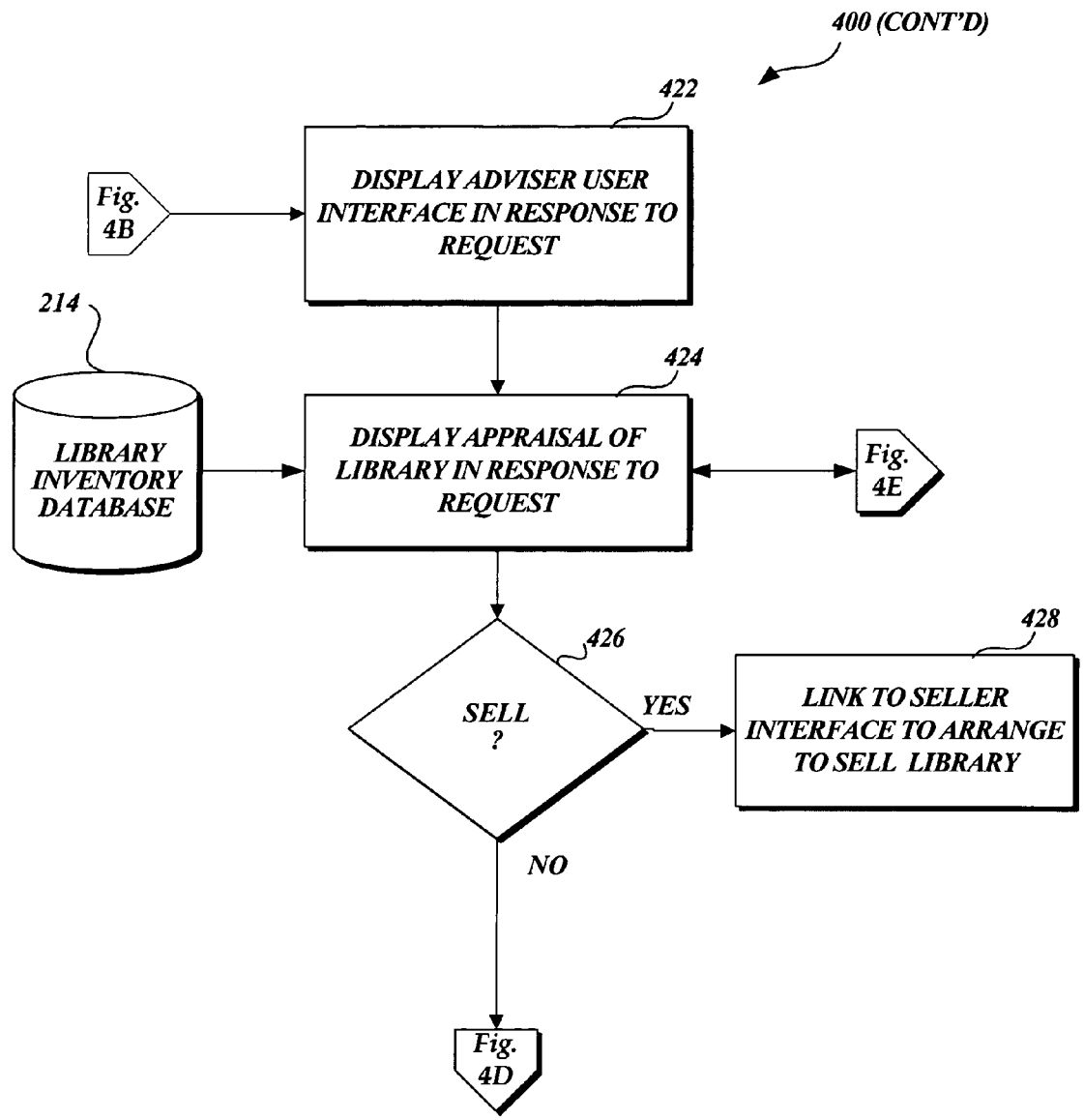

Referring now to FIG. 4C, the librarian process 400 continues at process block 422, to display an adviser user interface to the user in response to a request for advice from the librarian 300 regarding a particular library. In the illustrated adviser interface in FIG. 12 at reference numeral 1202, entitled "Advise Me About My Library" at reference numeral 1204, the user has entered the name of the library "Mary's Library" at reference numeral 1206 for which the user is seeking advice. The user is optionally prompted to select the name of a particular collection at reference numeral 1210 within the library for which advice is sought using a drop-down box at reference numeral 1212, here selecting the "Kids" collection. The librarian process 400 further prompts the user to specify at reference numeral 1214 "Please check type of advice," what type of advice he or she is seeking, below which appears selection options for the type of advice. In this example, the selection options provided include an appraisal of the library at reference numeral 1216, acquisition recommendations at reference numeral 1218, and organization advice at reference numeral 1220. The librarian process 400 provides the user with a command button at reference numeral 1208 labeled "ADVISE," that may be activated by the user to cause the librarian process 400 to, in turn, cause the Web browser program 500 to display the selected interface for the type of advice that is being sought, for the specified library and collection. The librarian process 400 further prompts the user with the text at reference numeral 1222 "Please specify notification preferences," to specify his or her preferences when generating the selected advice, below which appears preference options to use when generating the selected advice. In this example, the preference options provided include options for specifying preferences related to the frequency 1224 of generating the advice, here shown as "WEEKLY," and/or communication method 1226 for notifying the user about the advice, here shown as "EMAIL." Other preference options related to frequency may include, without limitation, daily, bi-weekly, monthly, etc. or on demand. Other preference options related to the communication method may include, without limitation, voicemail, instant message, text message, etc. The preference options that are provided may differ from that shown in FIG. 12, depending on the type of advice that has been selected.

Returning now to FIG. 4C, when the user has requested advice regarding an appraisal of their library at process block 424, the librarian process 400 computes or otherwise obtains an appraisal of the inventory associated with the designated library as stored in the library inventory database 214, and, optionally, confines the appraisal to a collection of products in the library if so designated by the user in the adviser interface described above with reference to FIG. 12. The process 400 further continues at decision block 426 to determine whether user wishes to sell their library, and, if so, branches to process block 428, where the user can link to a seller interface to arrange to sell the contents of their library online.

Figure 4D:
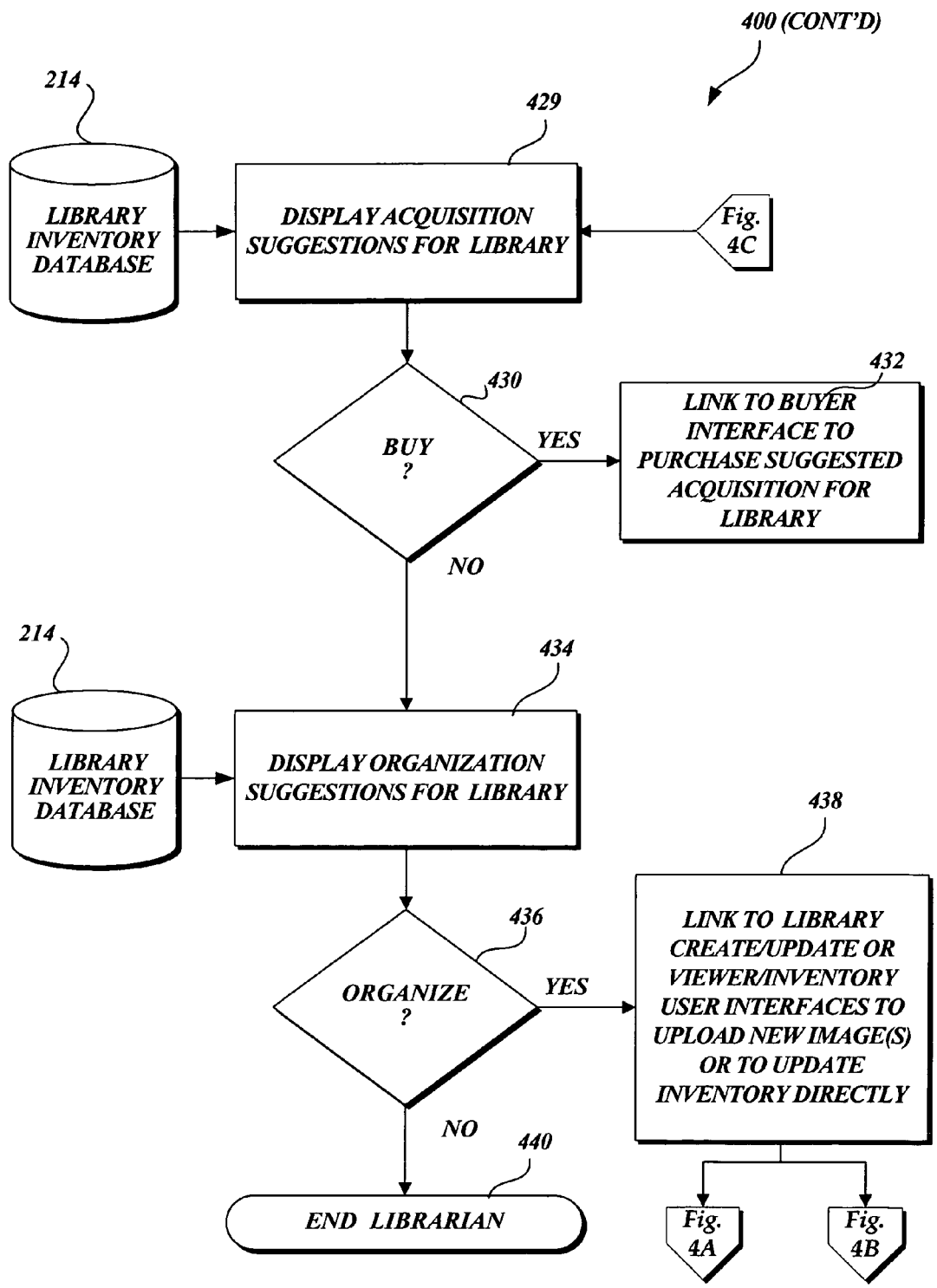
Figure 4E:
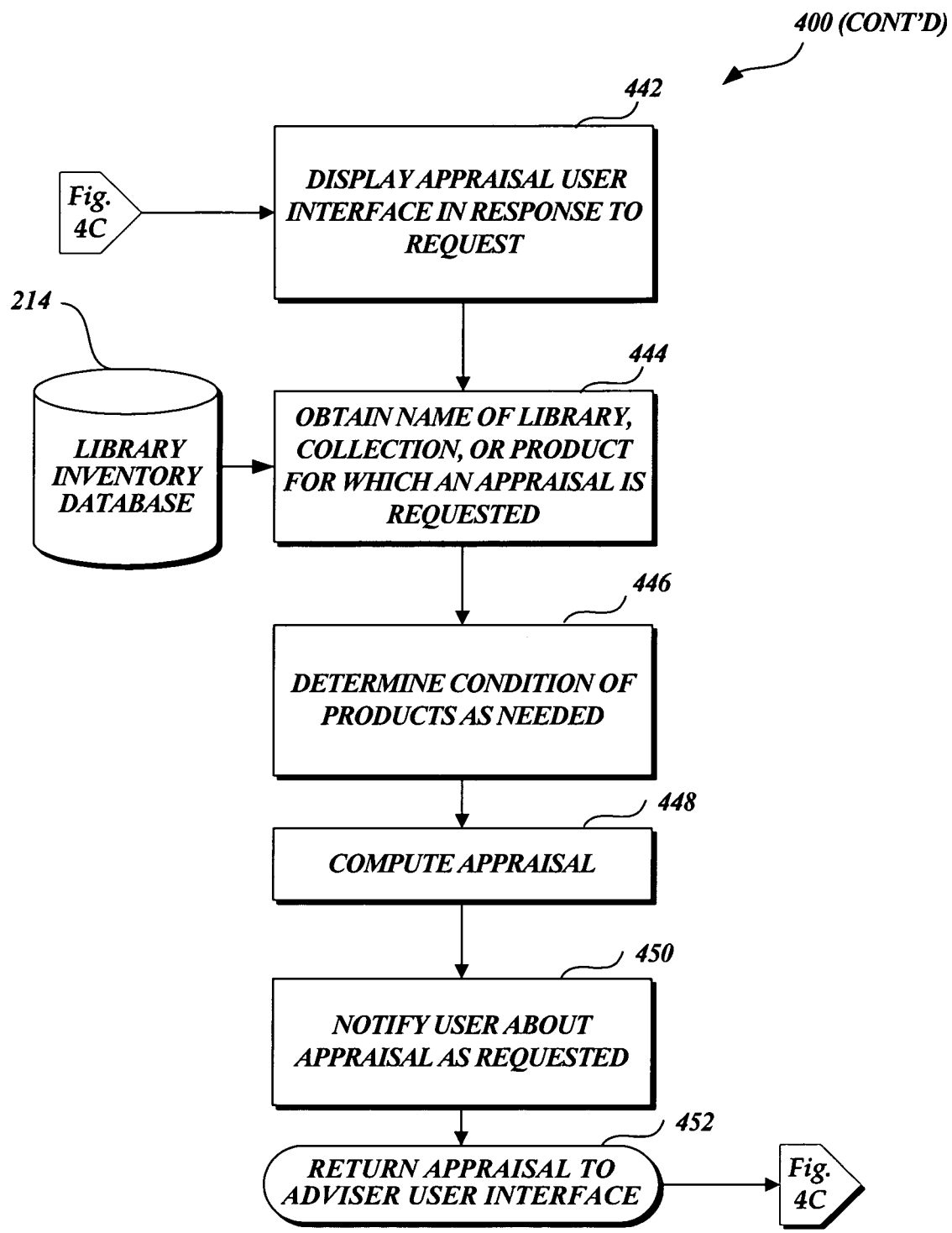
Figure 13A:
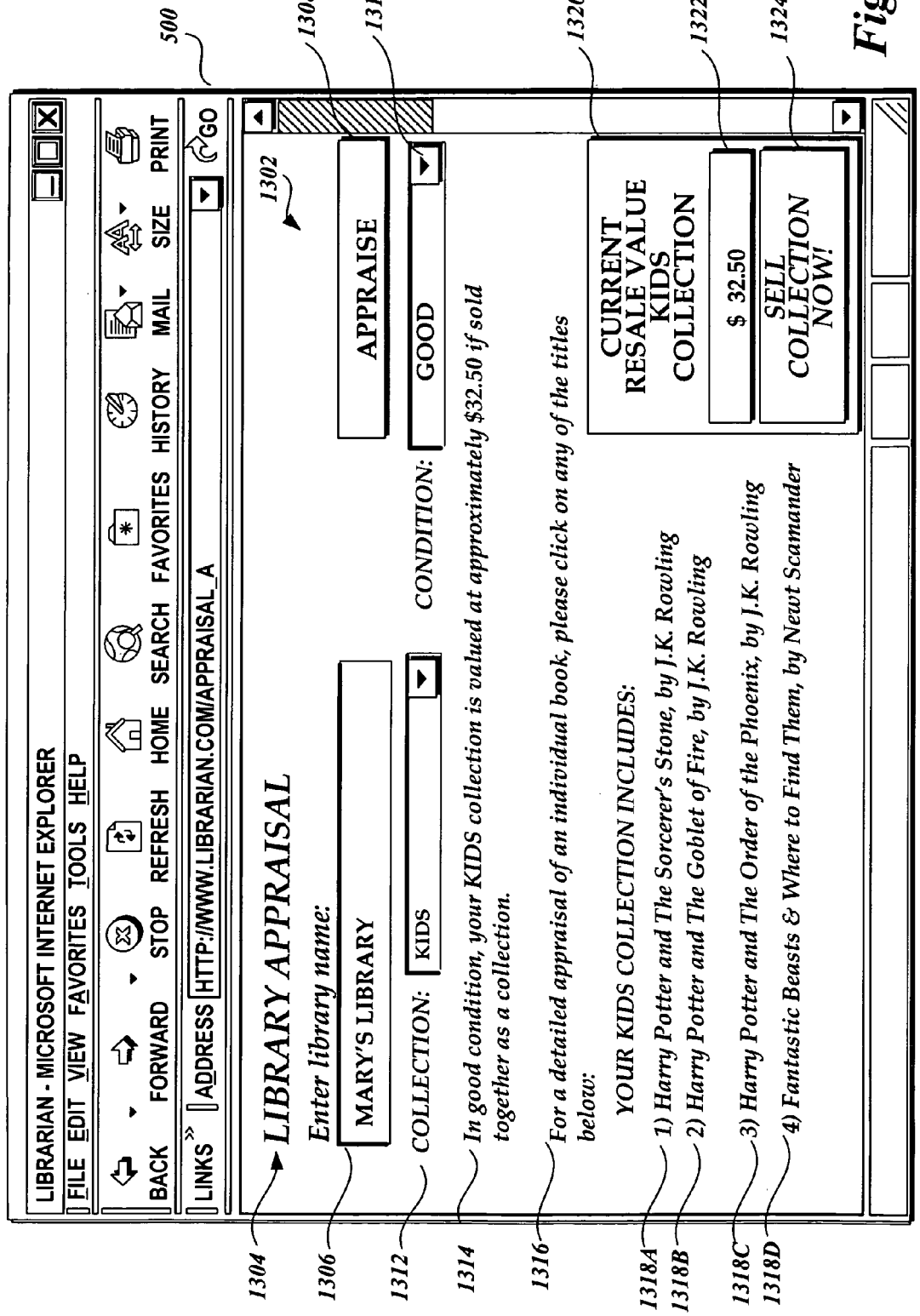
FIGS. 13A-13C depict a browser program with example Web pages presenting a librarian appraisal interface to a user in accordance with an embodiment of the invention.
Figure 13B:
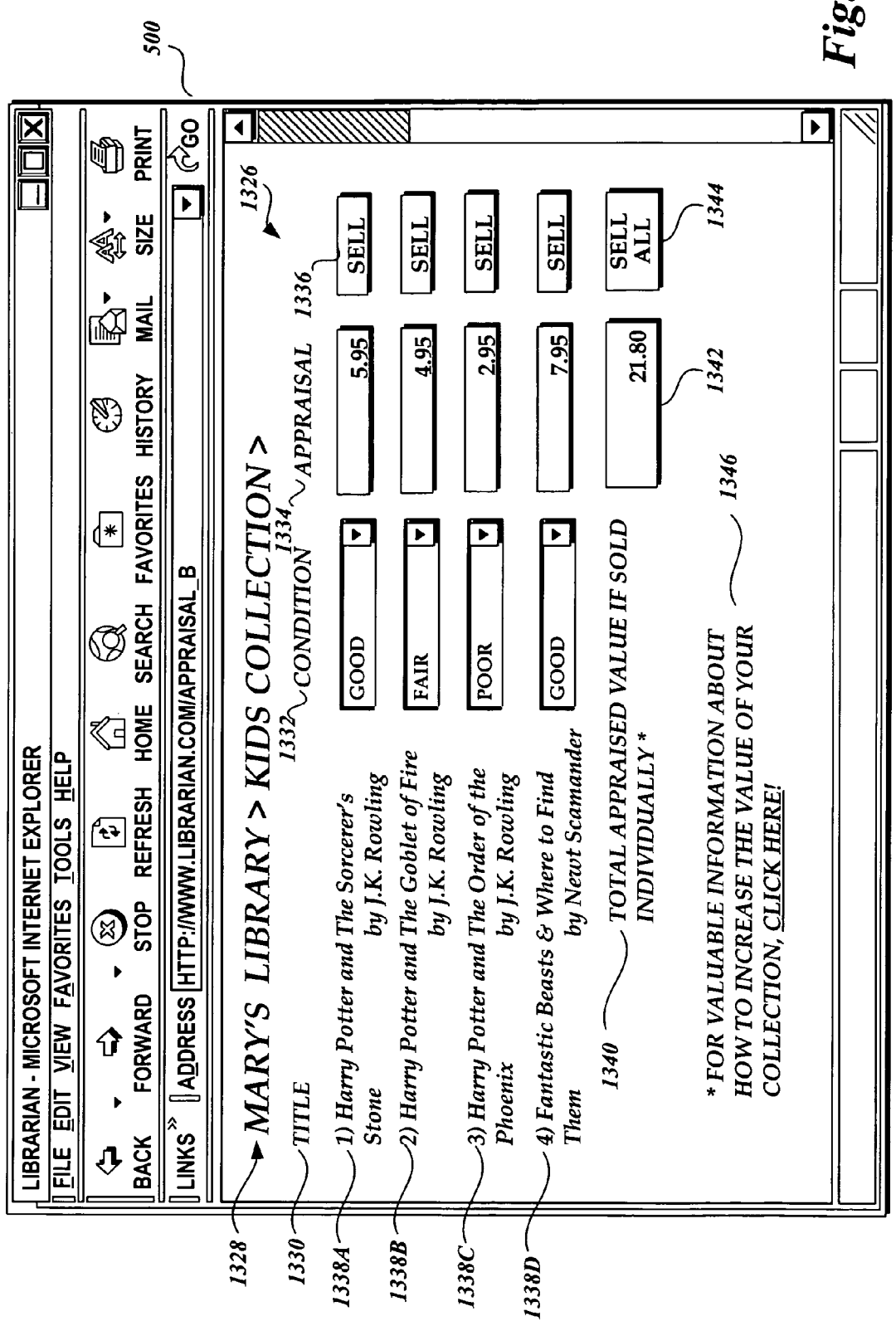
Figure 13C:
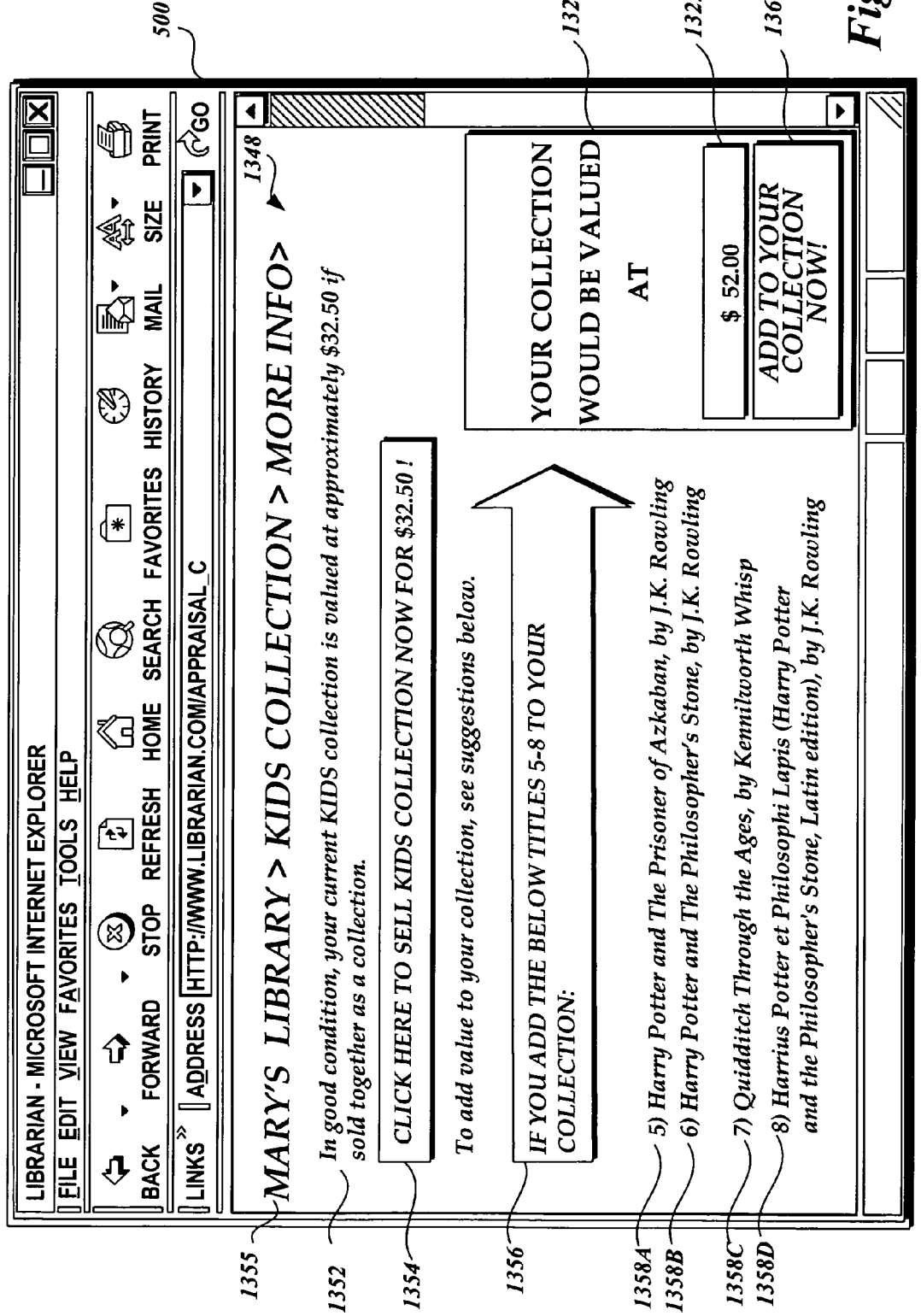

Referring now to FIG. 4E, as an example of the appraisal process, at process block 442, the librarian process 400 causes the Web program 500 to display an appraisal interface in response to the user's request, as illustrated in FIGS. 13A-13C. With reference to FIG. 13A at reference numeral 1302, entitled "LIBRARY APPRAISAL," at reference numeral 1304. The librarian process 400 continues at process block 444 to obtain the name of the library, collection, or product for which an appraisal has been requested, as the case may be. For example, as shown in FIG. 13, the name of the library, "Mary's Library," for which an appraisal is requested appears in a text box at reference numeral 1306 along with the name of the collection at reference numeral 1310, here selected as the "Kids" collection as appears in drop-down box at reference numeral 1312. In one embodiment, an appraisal may be requested for a particular product in the library by library by selecting, for example, the particular title similar to the title selection shown in FIG. 10.

The librarian process 400 continues at process block 446 to determine the condition of the product or products, e.g., the title or collection, for which an appraisal is requested, as needed. For example, as shown in FIG. 13, the user is prompted at reference numeral 1310 to enter or select a description of the overall condition of the collection, e.g., whether the condition is fair, poor, good, missing dust covers, missing liner notes, etc. In the illustrated example, the overall condition of the selected "Kids" collection is specified as "GOOD," as appears in drop-down box at reference numeral 1310. It is understood, however, that the condition of a product may not always be relevant to the computation of a particular appraisal. For example, when the product is a compact disk (CD), the medium is generally very durable, and will not deteriorate to any great degree over a period of time, unless the wear is excessive. Accordingly, at process block 446, in one embodiment the librarian process 400 instead determines an expected condition of the product based on the age of the product, and without further reference to the actual condition of the product, whether or not that information has been indicated by the user. In some cases, the condition of the product may be determined from the absence or presence of any parts of the product, e.g. a book's dust cover, a CD's liner notes, etc., as indicated by the user in the description of the condition of the product at reference numeral 1310.

The librarian process 400 continues at process block 448, by providing the user with a command button 1308 labeled "APPRAISE," which may be activated by the user to cause the librarian process 400 to compute an appraisal for the product, collection and/or library already specified prior to navigating to the appraisal interface, or to compute or otherwise obtain an appraisal for a newly specified product, collection and/or library. The librarian process 400 may compute or otherwise obtain appraisals in various ways, including prompting the user to self-assess the condition of each product in a collection, and consulting a resale value database (not shown) to obtain resale values for a product in the assessed condition. Other ways of computing and/or otherwise obtaining the appraisal for the specified product, collection and/or library may include, as previously described, determining an expected condition of the product based on the age of the product, and consulting a resale value database (not shown) to obtain resale values for the product in the described condition.

Once computed, the resale values comprising the appraisal may be listed for individual products in the library, a collection of products, or for the entire library.

Returning again to FIGS. 4C, 4D, and FIG. 13A, the librarian process 400 notifies the user about the appraisal as requested, at process block 450, and returns the computed appraisal to the adviser user interface at process block 452. The librarian process 400, in turn, at process block 424, displays the appraisal of the collection (or library) in the form of text appearing at reference numeral 1314, in this example "In good condition, your KIDS collection is valued at approximately $32.50 if sold together as a collection." Along with the textual appraisal, the library appraisal interface 1304 typically includes a detailed appraisal of each product in the inventory associated with the library and/or collection. For example, at reference numeral 1316, the text "For a detailed appraisal of an individual book, please click on any of the titles below:" appears above a list of the individual products in the KIDS collection, here including the books entitled "Harry Potter and the Sorcerer's Stone," at reference numeral 1318A, "Harry Potter and the Goblet of Fire", at reference numeral 1318B, "Harry Potter and the Order of the Phoenix," at reference numeral 1318C, and "Fantastic Beasts & Where to find Them," at reference numeral 1318D. The detailed appraisal may appear as described with reference to FIG. 13B. In another embodiment, the appraisal for the collection (or library) and/or detailed appraisal may be displayed with the image of the corresponding product(s). In addition or in the alternative, the appraisal may be displayed with the corresponding inventory information for the product(s). Continuing with reference to FIG. 13A, the library appraisal interface 1304 may include a display entitled "CURRENT RESALE VALUE KIDS COLLECTION," at reference numeral 1320, beneath which is displayed the appraised value of the collection, here "$32.50," at reference numeral 1322. As shown, the library appraisal interface 1304 may further includes a command button labeled "SELL COLLECTION NOW!" at reference numeral 1324, so that the user can navigate to an interface that will assist the user in placing the collection up for sale. In FIG. 13B, the resale values comprising the appraisal may be also be displayed individually, i.e., the detailed appraisal, to provide the user with a more comprehensive appraisal of their library.

Returning again to FIGS. 4C, 4D, and also to FIG. 13B, the librarian process 400, at process block 424, displays a detailed appraisal interface at reference numeral 1326, here for products contained in "MARY'S LIBRARY>KIDS COLLECTION>" as identified at reference numeral 1328. As shown, the detailed appraisal of the products may be displayed in the form of a tabulated list with a column entitled "TITLE," at reference numeral 1330, below which is listed the titles or other identifying information of each product for which a detailed appraisal is displayed, a column entitled "CONDITION," at reference numeral 1332, below which is provided a pull-down list of choices for describing the condition of the product, such as good, fair, or poor, and a column entitled "APPRAISAL," at reference numeral 1334, below which is provided the detailed appraised value of the product in the collection. As shown in the illustrated example, the detailed appraisal of products in the KIDS COLLECTION of MARY'S LIBRARY includes the titles "Harry Potter and the Sorcerer's Stone," in GOOD condition, valued at $5.95 at reference numeral 1338A, "Harry Potter and the Goblet of Fire," in FAIR condition, valued at $4.95 at reference numeral 1338B, "Harry Potter and the Order of the Phoenix," in POOR condition, valued at $2.95 at reference numeral 1338C, and "Fantastic Beasts & Where to Find Them," in GOOD condition, valued at $7.95 at reference numeral 1338D.

Continuing with reference to FIG. 13B, the detailed library appraisal interface 1326 further includes command buttons labeled "SELL" at reference numeral 1336 to sell each individual title shown at reference numerals 1338A, 1338B, 1338C, and 1338D, respectively, and a command button labeled "SELL ALL" to aggregate the sale of all of the selected titles, e.g., an entire inventory of titles associated with a selected collection or library, at reference numeral 1344. As shown in the illustrated example, the text "TOTAL APPRAISED VALUE IF SOLD INDIVIDUALLY," at reference numeral 1340 is displayed together with the value "$21.80," at reference numeral 1342 to indicate to the user the total value of selling each of the listed titles individually at their detail appraised values. The total value may or may not be the same as selling all of the products together as a collection, i.e., the collection as a whole may be worth more or less than the individual products comprising the collection. In one embodiment, the librarian process 400 may provide the user with additional information related to the appraised value. For example, text such as "FOR VALUABLE INFORMATION ABOUT HOW TO INCREASE THE VALUE OF YOUR COLLECTION, CLICK HERE!" at reference numeral 1346 may be displayed to alert the user to information that may help them increase the value of their collection. In the illustrated example, clicking on the text will transfer the user to another interface, such as the extended appraisal interface described with reference to FIG. 13C below.

Continuing with reference to FIG. 13B, when the sell links are activated by the user, the librarian process 400 transfers the user to another Web page (not illustrated) containing a seller interface in which the user may arrange to sell the contents of their library by listing their books for sale on a merchant web site. In a typical embodiment, the librarian process 400 pre-populates the various data fields used to present the titles for sale on the merchant web site wherever possible to facilitate the sale.

Referring now to FIG. 4E, as an example of an extended appraisal process, at process block 442, the librarian process 400 causes the Web program 500 to display an extended appraisal interface in response to the user's request, e.g., when the user clicks on the additional information link at reference numeral 1346 in FIG. 13B. For example, the librarian process 400 at process block 448 may have computed an extended appraisal, such as identifying one or more additional products that a user may add to a collection in a library to enhance the summary appraised value of the collection. Alternatively, or in addition to a monetary value, the librarian process 400 at process block 448 may have computed an extended appraisal that includes such non-monetary information as a relative scarcity of a particular product, e.g., rare vs. common, or such information as whether the collection is or is not complete, e.g., adding a third and final book in a series would complete a collection of books in a series. Once computed, the extended appraisal may be displayed as shown in the illustrated example in FIG. 13C, in which the librarian process 400 displays an extended appraisal interface at reference numeral 1348, here for products contained in "MARY'S LIBRARY>KIDS COLLECTION>MORE INFO>" as identified at reference numeral 1355. As in FIG. 13A, the librarian process 400, at process block 424, displays the summary appraisal of the collection (or library) in the form of text appearing at reference numeral 1352, in this example "In good condition, your KIDS collection is valued at approximately $32.50 if sold together as a collection." Beneath the summary appraisal is displayed a command button captioned "CLICK HERE TO SELL KIDS COLLECTION NOW FOR $32.50," at reference numeral 1354, so that the user may navigate away from the extended appraisal at reference numeral 1348, to immediately sell the collection as it currently stands. However, if the user is interested in extending the value of their collection, the user is further alerted to the extended appraisal in highlighted text "IF YOU ADD THE BELOW TITLES 5-8 TO YOUR COLLECTION:" "YOUR COLLECTION WOULD BE VALUED AT" at reference numerals 1356 and 1320, and a monetary value comprising the extended appraisal, here "$52.00" at reference numeral 1322, an increase in value of nearly $20 more than the KIDS collection as it currently exists. Such extended appraisal information may function as an incentive for a user to augment their collection with products that are identified as part of the extended appraisal, particularly if they can obtain them for less than $20.00, thereby insuring a subsequent profitable sale of the KIDS collection. In the illustrated example, a list of the products that were identified as part of the extended appraisal appears beneath the highlighted text, in this case including the titles "Harry Potter and the Prisoner of Azkaban," at reference numeral 1358A, "Harry Potter and the Philosopher's Stone," at reference numeral 1358B, "Quidditch Through the Ages," at reference numeral 1358C, and "Harrius Potter et Philosophi Lapis (Harry Potter and the Philosopher's Stone, Latin edition)," at reference numeral 1358D. As shown, the extended appraisal interface 1348 may further includes a command button labeled "ADD TO YOUR COLLECTION NOW!" at reference numeral 1360, which, when activated by the user, cause the librarian process 400 to transfer the user to another Web page (not illustrated) containing a merchant interface in which the user may arrange to purchase the recommended titles, similar to the librarian process 400 for library acquisition as described below with reference to FIG. 4D and FIG. 14.

Referring once again to FIG. 4E, the librarian process 400 at process block 450, notifies the user about the appraisal of the title, collection, or selected library as requested. The notification is made in accordance with the notification preferences previously specified, e.g., weekly updates via email containing a link to the appraisal interface 1304 described above. Accordingly, the process at reference number 448 may be performed on demand, or may be repeated in accordance with the notification preferences of frequency 1224 and communication method 1226 as previously described with reference to FIG. 12. In the illustrated example, the notification may have been sent to the user in the form of an email message that, when activated, caused the Web browser 500 to display the library user interface as shown in FIG. 13, populated with appraisals in the form of resale values at reference link 1320.

Referring now to FIG. 4D, the librarian process 400 continues at process block 429, to display an acquisition user interface to the user in response to a request for advice from the librarian 300 regarding suggested acquisitions for a particular library. The process 400 further continues at decision block 430 to determine whether user wishes to buy the recommended titles, and, if so, branches to process block 432, where the user can link to a merchant interface to arrange to purchase the recommended titles online.

Figure 14:
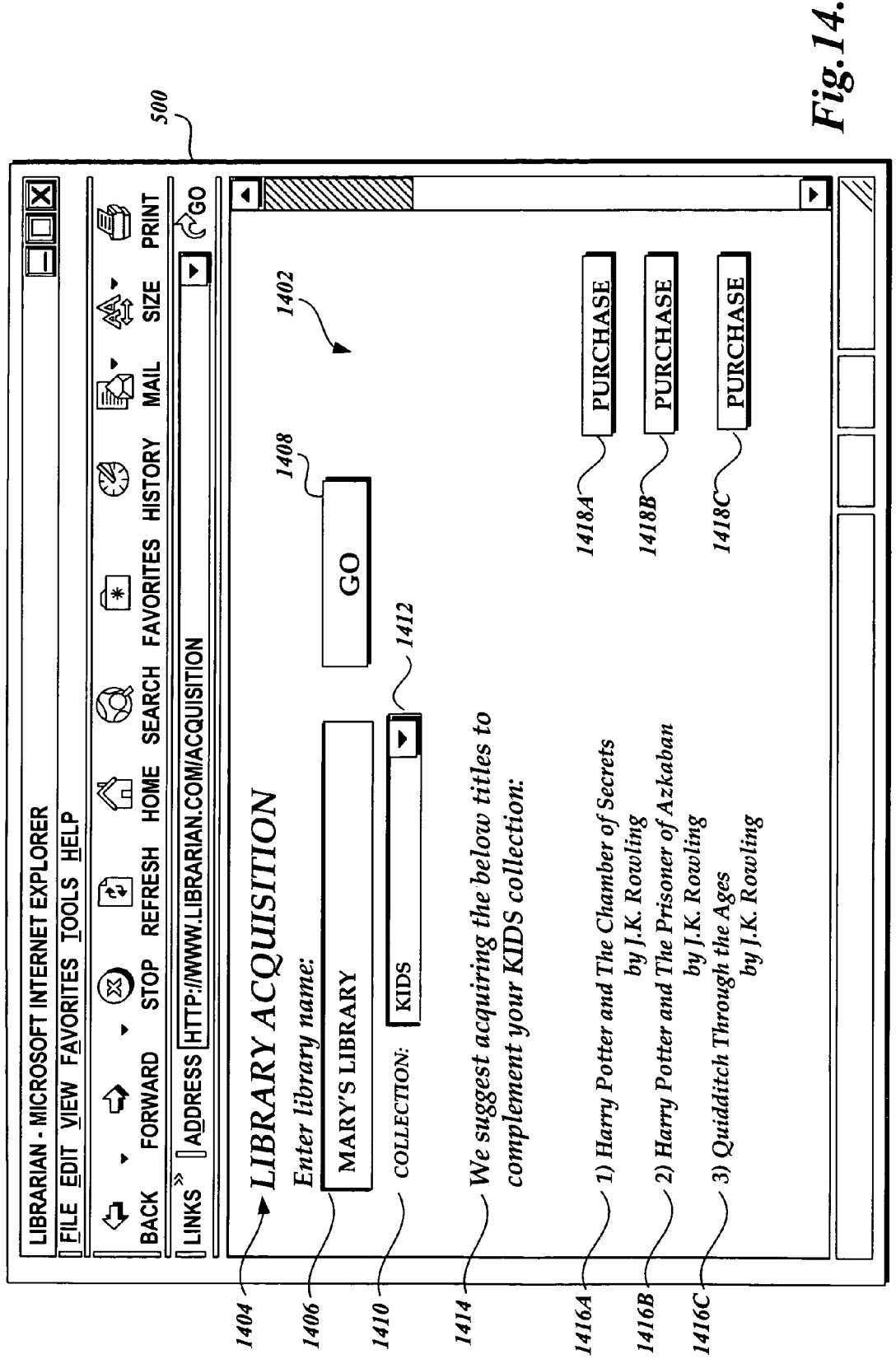
FIG. 14 depicts a browser program with an example Web page presenting a librarian acquisition interface to a user in accordance with an embodiment of the invention.

In the illustrated acquisition interface in FIG. 14 at reference numeral 1402, entitled "Library Acquisition" at reference numeral 1404, the user has entered the name of the library "Mary's Library" at reference numeral 1406 for which the user is seeking acquisition recommendations or suggestions. The user is optionally prompted to select the name of a particular collection at reference numeral 1410 within the library for which acquisition recommendations are sought using a drop-down box at reference numeral 1412, here selecting the "Kids" collection. The librarian process 400 prompts the user with the acquisition recommendations for the specified collection (or library) in the form of text appearing at reference numeral 1414, in this example "We suggest acquiring the below titles to complement your KIDS collection."

In one embodiment, the librarian process 400 generates the acquisition recommendations in consultation with an acquisition database (not shown), in which is stored pre-defined recommendations by genre, category, age group, etc. In one embodiment, the recommendations may be dynamically generated to complement historical data obtained from the history database 212 for the user. Below the text 1414, the library acquisition interface 1402 typically includes a list of one or more items that the librarian 300 recommends adding to the library. In the illustrated example, the librarian process 400 causes the Web browser program 500 to display three items, including "Harry Potter and The Chamber of Secrets," at reference numeral 1416A, "Harry Potter and The Prisoner of Azkaban," at reference numeral 1416B, and "Quidditch Through the Ages" at reference numeral 1416C. Along with the list of each book is displayed a command button labeled "PURCHASE" at reference numerals 1418A, 1418B, and 1418C, which, when activated by the user, cause the librarian process 400 to transfer the user to another Web page (not illustrated) containing a merchant interface in which the user may arrange to purchase the recommended titles.

Returning now to FIG. 4D, the librarian process 400 continues at process block 434, to display an organization user interface to the user in response to a request for advice from the librarian 300 regarding suggestions for organizing a particular library. The process 400 further continues at decision block 436 to determine whether the user wishes to organize their library as suggested, and, if so, branches to process block 438, where the user is transferred to the library creation and update interface illustrated at FIG. 6 so that the user can begin the process of uploading new images of their reorganized library. Alternatively, the user is transferred to the library viewer and inventory interfaces at FIGS. 7-9 so that the user may update the inventory information directly to reflect the new organization.

Figure 15:
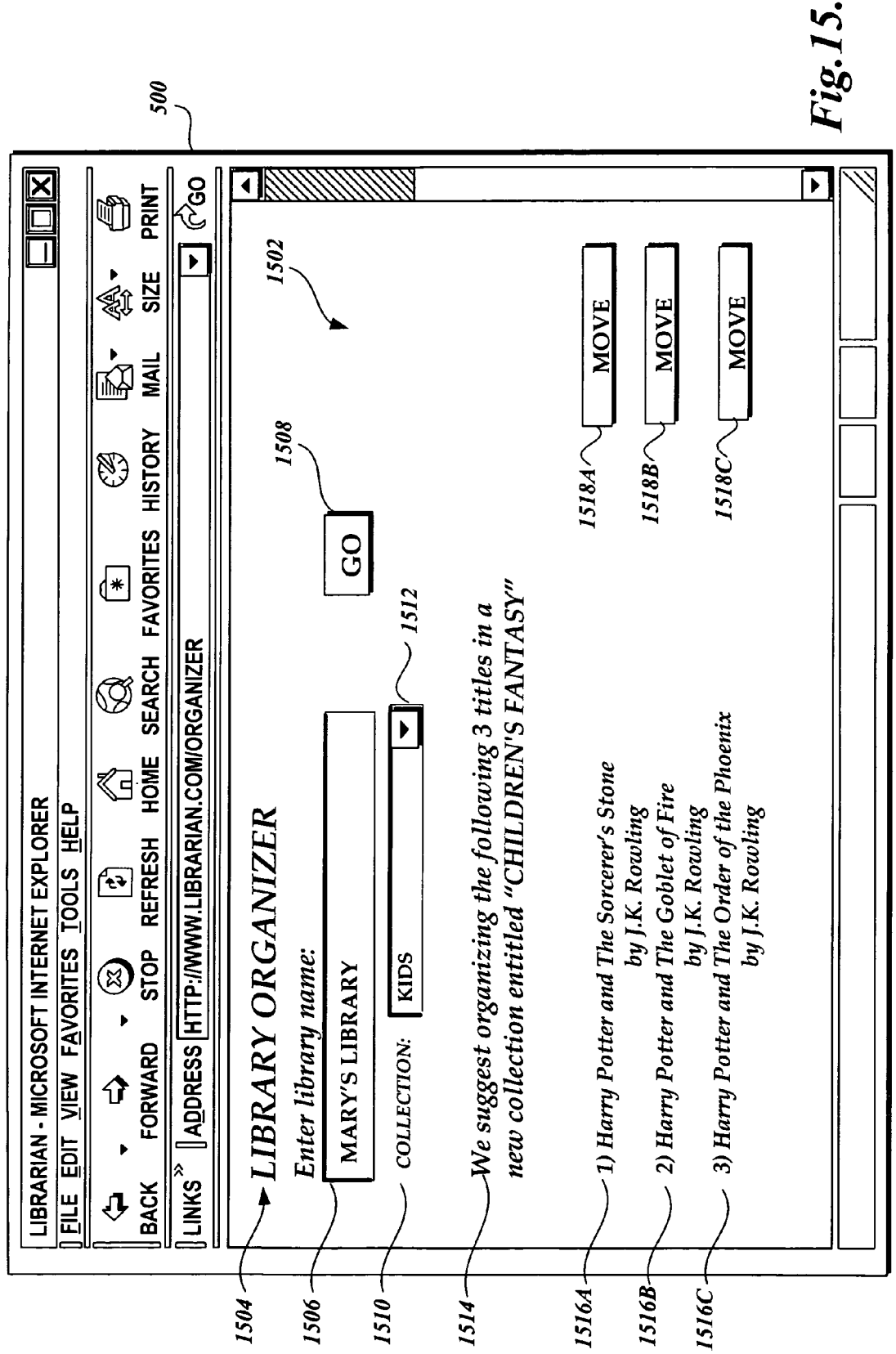
FIG. 15 depicts a browser program with an example Web page presenting a librarian organizer interface to a user in accordance with an embodiment of the invention.

For example, in the illustrated organization interface in FIG. 15 at reference numeral 1502, entitled "Library Organizer" at reference numeral 1504, the user has entered the name of the library "Mary's Library" at reference numeral 1506 for which the user is seeking organization advice. The user is optionally prompted to select the name of a particular collection at reference numeral 1510 within the library for which organization advice is sought using a drop-down box at reference numeral 1512, here selecting the "Kids" collection. The librarian process 400 prompts the user with organization advice for the specified collection (or library) in the form of text appearing at reference numeral 1514, in this example "We suggest organizing the following 3 titles in a new collection entitled "CHILDREN'S FANTASY," below which the library organization interface 1502 typically includes a list of one or more items that the librarian 300 recommends reorganizing to a different shelf or collection within the library. In the illustrated example, the librarian process 400 causes the Web browser program 500 to display three items, including "Harry Potter and the Sorcerer's Stone" at reference numeral 1516A, "Harry Potter and the Goblet of Fire" at reference numeral 1516B, and "Harry Potter and the Order of the Phoenix," at reference numeral 1516C. Along with the list of each book is displayed a command button labeled "MOVE" at reference numerals 1518A, 1518B, and 1518C, which, when activated by the user, cause the librarian process 400 to automatically update the inventory using the generated suggestions displayed in the library organizer interface 1502. Activating the "MOVE" buttons 1518A, 1518B, and 1518C may alternatively transfer the user to the library create/update interface 602 illustrated in FIG. 6 so that the user may reorganize their home bookshelves according to the suggestions, and upload new images of the reorganized bookshelves. Alternatively, the process 400 may transfer the user to the library viewer and inventory interfaces at reference numerals 702 and 802 in FIGS. 7 and 8, to allow the user the opportunity to update the inventory to reflect the suggested organization, which update may be performed manually.

It will be appreciated that describing the librarian process 400 by reference to the flow diagrams in FIGS. 4A-4E enables one skilled in the art to develop computer-executable instructions to carry out the process on suitably configured computers. The flow diagrams do not, however, constrain the execution of such instructions to carry out the process in any particular order, nor do they require that every aspect of the librarian process 400 described herein be carried out in every embodiment. In addition, the computer-executable instructions to carry out the process described in FIGS. 4A-4E may be written in a computer programming language or may be embodied in firmware logic. If written in a programming language conforming to a recognized standard, such instructions can be executed on a variety of hardware platforms and interface with a variety of operating systems.

It will be further appreciated that the present invention is not described with reference to any particular programming language, and it will be appreciated that a variety of programming languages may be used to implement the teachings of the invention as described. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

It will be further appreciated that the Web page interfaces described for the librarian 300 with reference to FIGS. 5-15 are only illustrative and do not serve to limit the general application of the invention. For example, links as referenced herein may be embodied by the command buttons illustrated and described at reference numerals 512, 518, 614, 708, 808, 1008, 1108, 1208, 1308, 1322, 1324, 1336, 1344, 1360, 1418, and 1518, by hypertext links, or by other selectable connections that, when activated, will cause the librarian process 400 to take the described action, such as transferring the user to another Web page interface, or generating an additional or updated display on the current Web page interface.

While typical embodiments of the invention have been illustrated and described above, it will be appreciated that various changes can be made therein without departing from scope of the claims that follow. For example, although the described embodiments refer primarily to implementations of the invention in the context of appraising a collection of products in a library containing books, other implementations in the context of appraising a collection of products in a library of music and videos, or other media products, are contemplated as being within the scope of the present invention.

The embodiments of the invention in which an exclusive property or privilege is claimed are defined as follows:

1. A computer-implemented method that is executed on a computing device for appraising products, comprising:
    receiving, by a computing device, a visual image of one or more products;
    analyzing, by a computing device, one or more visual elements in the received image and based on the analysis of the one or more visual elements, automatically recognizing a product identifier of a product depicted in the received image, wherein the product identifier includes product identification information that is part of the product and is visible in the received image;
    identifying, by a computing device, the product from the recognized product identifier; and
    generating, by a computing device, an appraisal of the product that is identified from the recognized product identifier.

2. The method of claim 1, wherein the appraisal is a monetary value associated with the product.

3. The method of claim 2, wherein the monetary value associated with the product is a resale value of the product.

4. The method of claim 1, wherein the appraisal is a non-monetary value associated with the product.

5. The method of claim 4, wherein the non-monetary value associated with the product is a relative assessment of value based on an availability of the product.

6. The method of claim 5, wherein the relative assessment of value is different when the availability of the product is scarce than when the availability is common.

7. The method of claim 1 further comprising providing notification of the appraisal of the product.

8. The method of claim 7, wherein providing notification of the appraisal comprises displaying the appraisal for the product with the image of the product.

9. The method of claim 7, wherein providing notification of the appraisal comprises sending at least one of a link to the appraisal, an email containing the link to the appraisal, and an instant message containing the link to the appraisal.

10. The method of claim 1, wherein generating the appraisal comprises generating a summary appraisal of a collection of products for which product identifiers were extracted from the image.

11. The method of claim 10, wherein the summary appraisal is at least one of a monetary value and non-monetary value associated with the collection of products.

12. The method of claim 11, wherein the non-monetary value associated with the collection of products is a relative assessment of completeness of the collection.

13. The method of claim 12, wherein the relative assessment of completeness is different when a number of products missing from the collection is small than when the number of products missing from the collection is great.

14. The method of claim 12, wherein the relative assessment of completeness is different when an availability of a product missing from the collection is scarce than when an availability of a product missing from the collection is common.

15. The method of claim 12, wherein the relative assessment of completeness is different when an availability of a product present in the collection is scarce than when an availability of a product present in the collection is common.

16. The method of claim 11, wherein the monetary value is a resale value of the collection when the products are sold as part of the collection.

17. The method of claim 12, wherein the monetary value is dependent on the relative assessment of completeness.

18. The method of claim 10, further comprising providing notification of the summary appraisal.

19. The method of claim 18, wherein providing notification of the summary appraisal comprises displaying a name of the collection of products for which the summary appraisal was generated and the corresponding summary appraisal associated with the collection.

20. The method of claim 19, wherein providing notification of the summary appraisal comprises displaying the corresponding summary appraisal associated with the collection with an image of the collection.

21. The method of claim 1, further comprising selecting an image from which the product identifier is revealed and the appraisal generated.

22. The method of claim 1, further comprising selecting a library, the library having an inventory of identified products for which the appraisal is generated.

23. The method of claim 22, further comprising selecting a collection within the library, the collection identifying a subset of the inventory of identified products for which the appraisal is generated.

24. The method of claim 1, further comprising providing a sell link in connection with the appraisal, wherein activating the sell link initiates a sale of the product for which the appraisal was generated.

25. A computer-implemented system for facilitating an appraisal, the system comprising:
    a repository containing a visual image of a product;
    a computing device in communication with the repository, wherein the computing device is configured to:
        analyze one or more visual elements in the received image and based on the analysis, automatically recognize human-comprehensible product identification information from the image of the product, wherein the human-comprehensible product identification information is visually revealed in the image of the product, and
        generate an appraisal of the product depicted in the image, wherein the appraisal is based on the recognized human-comprehensible product identification information; and
    a display device in communication with the computing device for displaying the generated appraisal.

26. The system of claim 25, wherein the appraisal is a monetary value associated with the product.

27. The system of claim 26, wherein the monetary value associated with the product is a resale value of the product.

28. The system of claim 25, wherein the appraisal is a non-monetary value associated with the product.

29. The system of claim 28, wherein the non-monetary value associated with the product is a relative assessment of value based on an availability of the product.

30. The system of claim 29, wherein the relative assessment of value is different when the availability of the product is scarce than when the availability is common.

31. The system of claim 25, wherein the computing device is further configured to provide notification that the appraisal has been generated.

32. The system of claim 31, wherein the notification that the appraisal has been generated is provided in accordance with a notification preference.

33. The system of claim 32, wherein the notification preference comprises at least one of a frequency of providing the notification and a communication method of providing the notification.

34. The system of claim 33, wherein the frequency of providing the notification comprises at least one of providing the notification daily, weekly, monthly, and on demand.

35. The system of claim 33, wherein the communication method of providing the notification comprises sending an email containing a link that, when activated, causes the computing device to display the appraisal on the display device.

36. The system of claim 33, wherein the communication method of providing the notification comprises sending a voicemail indicating that display of the appraisal on the display device may be requested.

37. The system of claim 33, wherein the communication method of providing the notification comprises sending an instant message indicating that display of the appraisal on the display device may be requested.

38. The system of claim 25, wherein the computing device is further configured to display the appraisal on the display device proximate to a display of the image in which the product is depicted.

39. The system of claim 25, wherein the computing device is further configured to display the appraisal on the display device proximate to a display of the product identification information extracted from the image.

40. The system of claim 25, wherein generating the appraisal comprises generating a summary appraisal of a collection of products depicted in the image.

41. The system of claim 40, wherein the summary appraisal is at least one of a monetary value and non-monetary value associated with the collection of products.

42. The system of claim 41, wherein the non-monetary value associated with the collection of products is a relative assessment of completeness of the collection.

43. The system of claim 42, wherein the relative assessment of completeness is different when a number of products missing from the collection is small than when the number of products missing from the collection is great.

44. The system of claim 42, wherein the relative assessment of completeness is different when an availability of a product missing from the collection is scarce than when an availability of a product missing from the collection is common.

45. The system of claim 42, wherein the relative assessment of completeness is different when an availability of a product present in the collection is scarce than when an availability of a product present in the collection is common.

46. The system of claim 42, wherein the monetary value is dependent on the relative assessment of completeness.

47. The system of claim 41, wherein the monetary value is a resale value of the collection when the products are sold together.

48. The system of claim 25, wherein the computing device is further configured to enable selection of the image from which the product identification information was extracted.

49. The system of claim 25, wherein the computing device is further configured to enable selection of a library, the library containing extracted product identification information from which the appraisal is generated.

50. The system of claim 49, wherein the computing device is further configured to enable selection of a collection within the library, the collection identifying a subset of extracted product identification information contained in the library from which the appraisal is generated.

51. The system of claim 50, wherein the computing device is further configured to enable specification of a condition of the collection within the library for which the appraisal is requested.

52. The system of claim 25, wherein the computing device is further configured to display a sell link on the display device corresponding to the displayed appraisal, wherein the sell link, when activated, causes the computing device to initiate sale of the product for which the appraisal was generated.

53. A computing apparatus, comprising:
a memory unit; and
a processor unit configured to execute instructions stored in the memory unit, wherein the instructions cause the computing apparatus to:
receive a visual image of products as the products appear in a location in which the products are stored;
receive a request for an appraisal of at least one of the products for which product identification information is revealed in the image of the products;
analyze one or more visual elements in the image of the products and based on the analysis of the one or more visual elements, automatically recognize the product identification information from the received image, wherein the product identification information is visible information that is part of the product; and
generate the appraisal based on the recognized product identification information.

54. The computing apparatus of claim 53, wherein the processor unit is further configured to receive an indication of a condition of the product for which the appraisal is requested.

55. The computing apparatus of claim 54, wherein the processor unit is further configured to generate the appraisal based on the indicated condition of the product.

56. The computing apparatus of claim 53, wherein the processor unit is further configured to notify a user of the generated appraisal.

57. The computing apparatus of claim 56, wherein the processor unit is further configured to receive a request to view the appraisal from the user that was notified, and to display the appraisal on a display device in response to the received request.

58. The computing apparatus of claim 56, wherein the processor unit is further configured to notify the user in accordance with a notification preference.

59. The computing apparatus of claim 53, wherein the processor unit is further configured to determine a monetary value associated with the product.

60. The computing apparatus of claim 59, wherein the processor unit is further configured to determine the monetary value associated with the product by executing instructions that cause the computing apparatus to determine a resale value of the product.

61. The computing apparatus of claim 53, wherein the processor unit is further configured to generate the appraisal by executing instructions that cause the computing apparatus to determine a non-monetary value associated with the product.

62. The computing apparatus of claim 61, wherein the processor unit is further configured to determine the non-monetary value associated with the product by executing instructions that cause the computing apparatus to generate a relative assessment of value based on an availability of the product.

63. The computing apparatus of claim 62, wherein the relative assessment of value is different when the availability of the product is scarce than when the availability is common.

* * * * *